(12) United States Patent
Kunimatsu et al.

(10) Patent No.: US 7,042,448 B2
(45) Date of Patent: May 9, 2006

(54) IMAGE PROCESSING UNIT, IMAGE PROCESSING SYSTEM USING THE SAME, AND IMAGE PROCESSING METHOD

(75) Inventors: Atsushi Kunimatsu, Kawasaki (JP); Kiyoji Ueno, Kawasaki (JP); Hideki Yasukawa, Yokohama (JP); Yukio Watanabe, Yokohama (JP); Takayuki Kamei, Ssagamihara (JP); Takanao Amatsubo, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 65 days.

(21) Appl. No.: 10/388,492

(22) Filed: Mar. 17, 2003

(65) Prior Publication Data

US 2003/0174132 A1 Sep. 18, 2003

Related U.S. Application Data

(62) Division of application No. 09/497,231, filed on Feb. 3, 2000, now Pat. No. 6,587,110.

(30) Foreign Application Priority Data

Feb. 3, 1999 (JP) .................................. 11-026563
Jan. 31, 2000 (JP) ............................. 2000-022197

(51) Int. Cl.
*G06T 17/00* (2006.01)
(52) U.S. Cl. ..................................................... 345/419
(58) Field of Classification Search ................ 345/419, 345/420, 421, 424, 426
See application file for complete search history.

(56) References Cited

U.S. PATENT DOCUMENTS 6,313,841 B1 11/2001 Ogata et al.

FOREIGN PATENT DOCUMENTS

JP 5-028280 A 2/1993

OTHER PUBLICATIONS

Watt et al., "Advanced Animation and Rendering Techniques Theory and Practice", 1992, ACM Press, pp. 219-228, 233-248 311-312.*
Westover, "Footprint Evaluation for Volume Rendering", 1990, ACM, pp. 367-376.*

* cited by examiner

*Primary Examiner*—Almis R. Jankus
(74) *Attorney, Agent, or Firm*—Foley & Lardner LLP

(57) ABSTRACT

The present invention provides an image processing unit, an image processing system, and an image processing method capable of achieving a higher speed and a higher efficiency in a rendering and implementing a low cost of the system. The image processing unit according to the present invention comprises a main storing portion for storing information of three-dimensional objects, a plurality of calculating portions for processing images based on three-dimensional object information which are read from the main storing portion, and a hierarchical storing portion having a plurality of hierarchies and connected between the main storing portion and the plurality of calculating portions to store a part of information at a lower level into a higher level sequentially, wherein image processing by the plurality of calculating portions are performed in parallel.

12 Claims, 36 Drawing Sheets

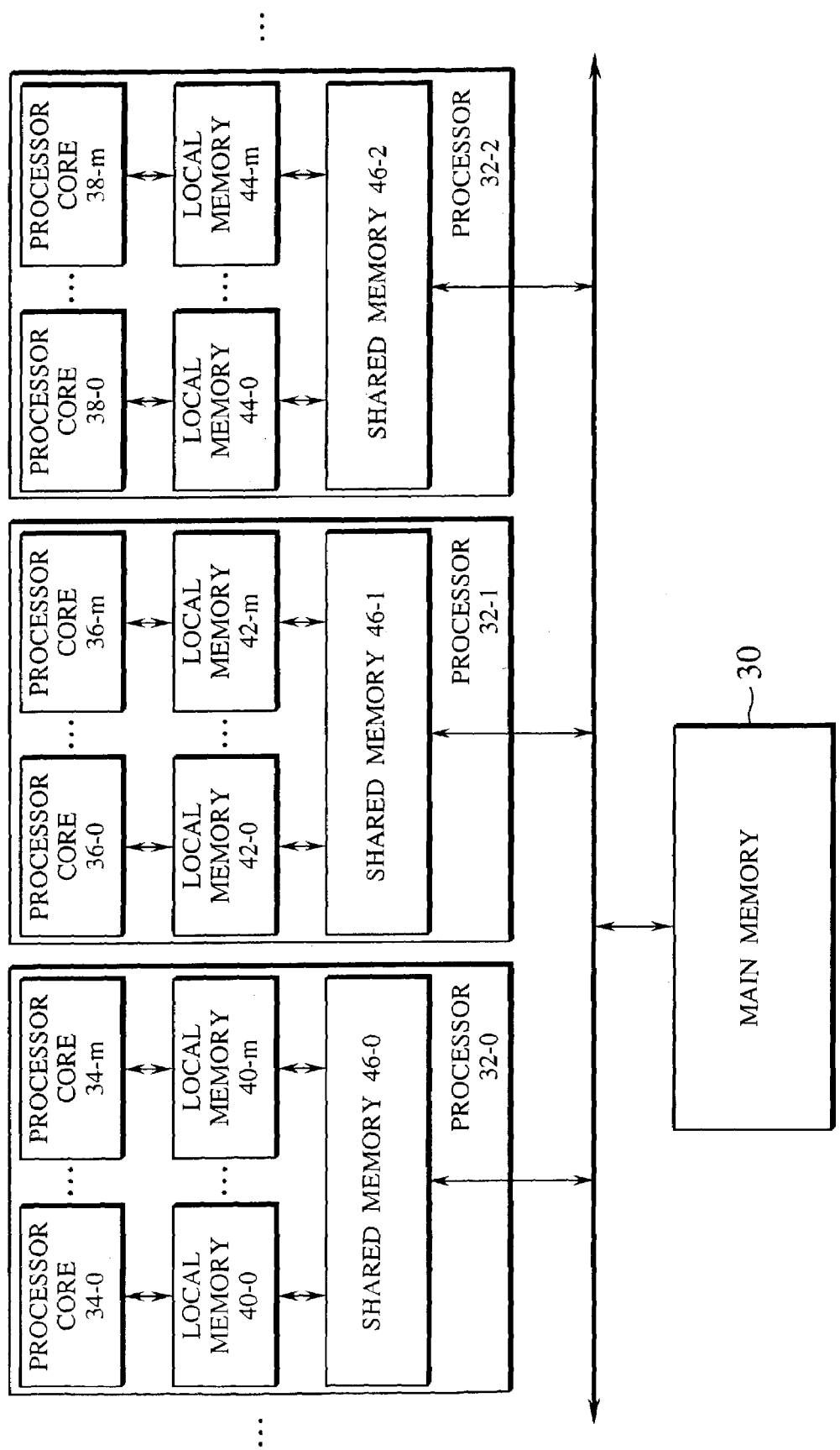

FIG.13

| ADDRESS | DATA |
|---|---|
| 0 x 00 | sphere |
| 0 x 01 | x coordinate |
| 0 x 02 | y coordinate |
| 0 x 03 | z coordinate |
| 0 x 04 | radius |
| 0 x 05 | color |
| 0 x 06 | ambient |
| 0 x 07 | diffuse |
| 0 x 08 | specular |
| 0 x 09 | ・・・・・・・・ |
| 0 x 0a | ・・・・・・・・ |
| 0 x 0b | ・・・・・・・・ |
| 0 x 0c | ・・・・・・・・ |

FIG.15A

CACHE MEMORY

|   | V | EN.No. | DATA |   |
|---|---|--------|------|---|
| 0 | 0 | — | — | ← 1 LINE |
| 1 | 0 | — | — | |
| 2 | 0 | — | — | |
| 3 | 0 | — | — | |
| 4 | 0 | — | — | |
| 5 | 0 | — | — | |
| 6 | 0 | — | — | |
| 7 | 0 | — | — | |
| 8 | 0 | — | — | |
| 9 | 0 | — | — | |
| 10 | 0 | — | — | |
| 11 | 0 | — | — | |
| 12 | 0 | — | — | |
| 13 | 0 | — | — | |
| 14 | 0 | — | — | |
| 15 | 0 | — | — | |

V: VALID BIT
EN.No.: ENTRY No.

FIG.15B

CACHE TABLE

|   | V | OB.No. | S.L.No. |   |
|---|---|--------|---------|---|
| 0 | 0 | — | — | ← 1 ENTRY |
| 1 | 0 | — | — | |
| 2 | 0 | — | — | |
| 3 | 0 | — | — | |

OB.No.: OBJECT No.

S.L.No.: START LINE No.

FIG.18

|  | START ADDRESS | SIZE |
|---|---|---|
| object1 : | 0 x 2000 | 0 x 04 |
| object2 : | 0 x 2004 | 0 x 08 |
| object3 : | 0 x 200c | 0 x 06 |
| object4 : | 0 x 2002 | 0 x 06 |
| object5 : | 0 x 200a | 0 x 08 |
| object6 : | 0 x 200e | 0 x 04 |
| object7 : | 0 x 2012 | 0 x 04 |
| object8 : | 0 x 2018 | 0 x 06 |

FIG.19A

CACHE TABLE

| V | OB.No. | S.L.No. |
|---|--------|---------|
| 0 | — | — |
| 0 | — | — |
| 0 | — | — |
| 0 | — | — |

CACHE MEMORY

| V | EN.No. | DATA |
|---|--------|------|
| 0 | — | — |
| 0 | — | — |
| 0 | — | — |
| 0 | — | — |
| 0 | — | — |
| 0 | — | — |
| 0 | — | — |
| 0 | — | — |
| 0 | — | — |
| 0 | — | — |
| 0 | — | — |
| 0 | — | — |
| 0 | — | — |
| 0 | — | — |
| 0 | — | — |
| 0 | — | — |

FIG.19B

CACHE TABLE

| V | OB.No. | S.L.No. |
|---|--------|---------|
| 1 | 1 | 0 |
| 0 | — | — |
| 0 | — | — |
| 0 | — | — |

CACHE MEMORY

| V | EN.No. | DATA |
|---|--------|------|
| 1 | 0 | obj1 - data1 |
| 1 | 0 | obj1 - data2 |
| 1 | 0 | obj1 - data3 |
| 1 | 0 | obj1 - data4 |
| 0 | — | — |
| 0 | — | — |
| 0 | — | — |
| 0 | — | — |
| 0 | — | — |
| 0 | — | — |
| 0 | — | — |
| 0 | — | — |
| 0 | — | — |
| 0 | — | — |
| 0 | — | — |
| 0 | — | — |

FIG.19C

CACHE TABLE

| V | OB.No. | S.L.No. |
|---|--------|---------|
| 1 | 1 | 0 |
| 1 | 2 | 4 |
| 0 | — | — |
| 0 | — | — |

CACHE MEMORY

| V | EN.No. | DATA |
|---|--------|------|
| 1 | 0 | obj1 - data1 |
| 1 | 0 | obj1 - data2 |
| 1 | 0 | obj1 - data3 |
| 1 | 0 | obj1 - data4 |
| 1 | 1 | obj2 - data1 |
| 1 | 1 | obj2 - data2 |
| 1 | 1 | obj2 - data3 |
| 1 | 1 | obj2 - data4 |
| 1 | 1 | obj2 - data5 |
| 1 | 1 | obj2 - data6 |
| 1 | 1 | obj2 - data7 |
| 1 | 1 | obj2 - data8 |
| 0 | — | — |
| 0 | — | — |
| 0 | — | — |
| 0 | — | — |

FIG.19D

CACHE TABLE

| | V | OB.No. | S.L.No. |
|---|---|---|---|
| 0 | 1 | 1 | 0 |
| 1 | 1 | 2 | 4 |
| 2 | 1 | 3 | 12 |
| 3 | 0 | – | – |

CACHE MEMORY

| | V | EN.No. | DATA |
|---|---|---|---|
| 0 | 1 | 0 | obj1 - data1 |
| 1 | 1 | 0 | obj1 - data2 |
| 2 | 1 | 0 | obj1 - data3 |
| 3 | 1 | 0 | obj1 - data4 |
| 4 | 1 | 1 | obj2 - data1 |
| 5 | 1 | 1 | obj2 - data2 |
| 6 | 1 | 1 | obj2 - data3 |
| 7 | 1 | 1 | obj2 - data4 |
| 8 | 1 | 1 | obj2 - data5 |
| 9 | 1 | 1 | obj2 - data6 |
| 10 | 1 | 1 | obj2 - data7 |
| 11 | 1 | 1 | obj2 - data8 |
| 12 | 1 | 2 | obj3 - data1 |
| 13 | 1 | 2 | obj3 - data2 |
| 14 | 1 | 2 | obj3 - data3 |
| 15 | 1 | 2 | obj3 - data4 |

FIG.19E

CACHE TABLE

| | V | OB.No. | S.L.No. |
|---|---|---|---|
| 0 | 0 | 1 | 0 |
| 1 | 1 | 2 | 4 |
| 2 | 1 | 3 | 12 |
| 3 | 0 | – | – |

CACHE MEMORY

| | V | EN.No. | DATA |
|---|---|---|---|
| 0 | 1 | 2 | obj3 - data5 |
| 1 | 1 | 2 | obj3 - data6 |
| 2 | 1 | 0 | obj1 - data3 |
| 3 | 1 | 0 | obj1 - data4 |
| 4 | 1 | 1 | obj2 - data1 |
| 5 | 1 | 1 | obj2 - data2 |
| 6 | 1 | 1 | obj2 - data3 |
| 7 | 1 | 1 | obj2 - data4 |
| 8 | 1 | 1 | obj2 - data5 |
| 9 | 1 | 1 | obj2 - data6 |
| 10 | 1 | 1 | obj2 - data7 |
| 11 | 1 | 1 | obj2 - data8 |
| 12 | 1 | 2 | obj3 - data1 |
| 13 | 1 | 2 | obj3 - data2 |
| 14 | 1 | 2 | obj3 - data3 |
| 15 | 1 | 2 | obj3 - data4 |

ACCESS REQUEST
FROM PROCESSOR 0
1 WORD
ADDRESS ⌈0×1000⌋

ACCESS REQUEST
FROM PROCESSOR 1
1 WORD
ADDRESS ⌈0×1004⌋

COMBINE
IMPOSSIBLE

ACCESS REQUEST
FROM PROCESSOR 0
1 WORD
ADDRESS ⌈0×1000⌋

ACCESS REQUEST
FROM PROCESSOR 1
1 WORD
ADDRESS ⌈0×1004⌋

EXTENDED
COMBINE

ACCESS REQUEST
FROM PROCESSORS 0 AND 1
2 WORD
ADDRESS ⌈0×1000⌋

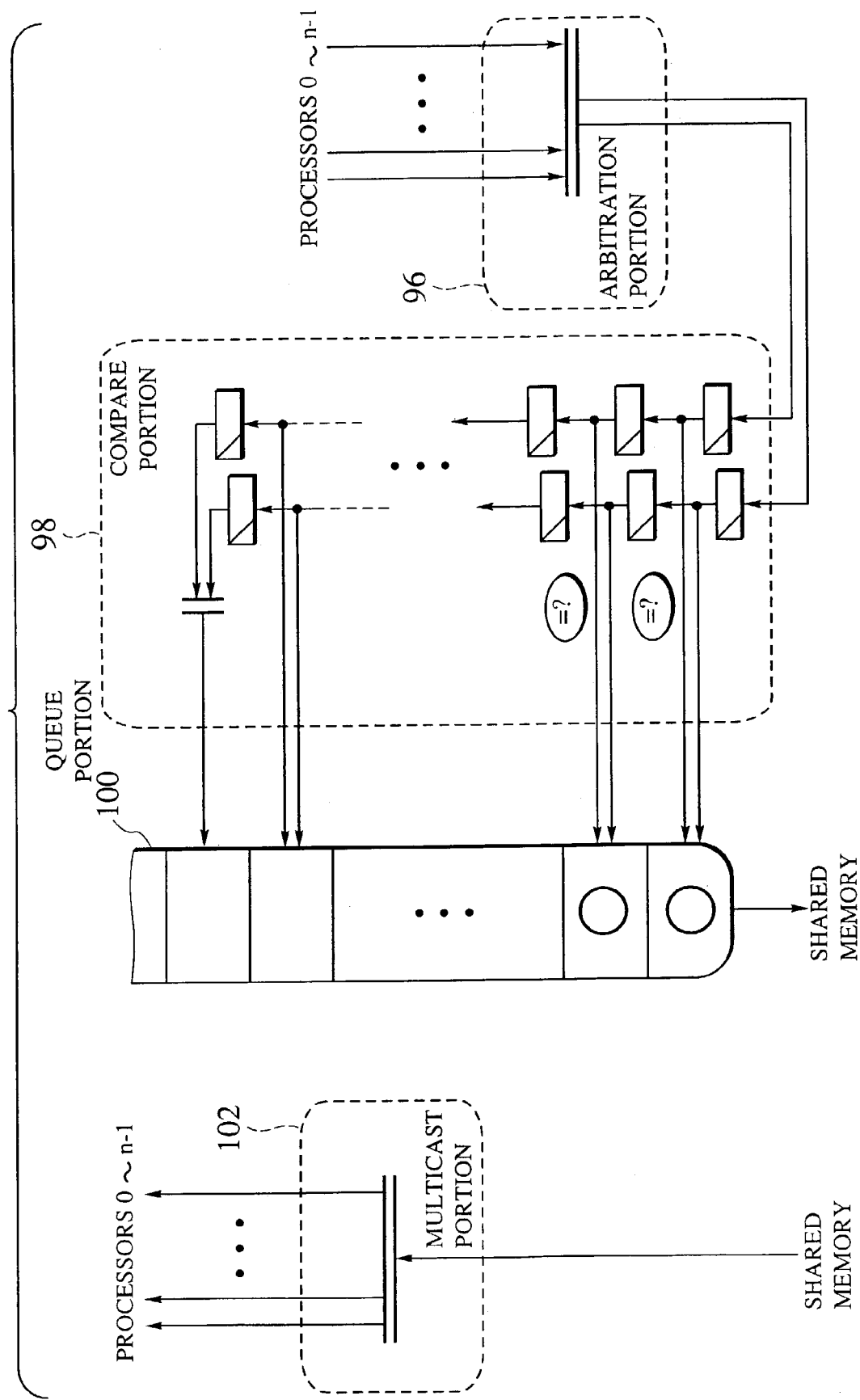

PROCESSORS 0 ~ n-1

MULTIPLEXER 104   ACCESS TABLE 106

COMPARE PORTION

COMPARE WITH THE SECOND ENTRY

COMPARE WITH THE FIRST ENTRY

ARBITRATION PORTION

|  | 0 | 1 | 2 | 3 | 4 | 5 | 6 | 7 |
|---|---|---|---|---|---|---|---|---|
| 0 |  |  |  |  | 1 | 1 | 1 | 1 |
| 1 |  |  | 1 | 1 |  |  |  |  |
| 2 | 1 | 1 |  |  |  |  |  |  |
| 3 | 1 | 1 |  |  |  |  |  |  |
| 4 |  |  |  |  |  |  |  |  |
| 5 |  |  |  |  |  |  |  |  |
| 6 |  |  |  |  |  |  |  |  |
| 7 |  |  |  |  |  |  |  |  |

PROCESSOR No.

FIG.33A

| PIXEL No. | END | SUBSPACE | OBJECT | I.C. | DISTANCE |
|---|---|---|---|---|---|
| p0 | No | — | — | — | ∞ |
| p1 | No | — | — | — | ∞ |
| p2 | No | — | — | — | ∞ |
| p3 | No | — | — | — | ∞ |

I.C. : INTERSECTION COORDINATE

FIG.33B

| PIXEL No. | END | SUBSPACE | OBJECT | I.C. | DISTANCE |
|---|---|---|---|---|---|
| p0 | No | S12 | — | — | ∞ |
| p1 | No | S12 | — | — | ∞ |
| p2 | No | S12 | — | — | ∞ |
| p3 | No | S12 | — | — | ∞ |

FIG.33C

| PIXEL No. | END | SUBSPACE | OBJECT | I.C. | DISTANCE |
|---|---|---|---|---|---|
| p0 | Yes | S12 | obj5 | (x1,y1) | d1 |
| p1 | No | S12 | — | — | ∞ |
| p2 | Yes | S12 | obj6 | (x2,y2) | d2 |
| p3 | No | S12 | — | — | ∞ |

FIG.33D

| PIXEL No. | END | SUBSPACE | OBJECT | I.C. | DISTANCE |
|---|---|---|---|---|---|
| p0 | Yes | S12 | obj5 | (x1,y1) | d1 |
| p1 | No | S13 | — | — | ∞ |
| p2 | Yes | S12 | obj6 | (x2,y2) | d2 |
| p3 | No | S13 | — | — | ∞ |

FIG.33E

| PIXEL No. | END | SUBSPACE | OBJECT | I.C. | DISTANCE |
|---|---|---|---|---|---|
| p0 | Yes | S12 | obj5 | (x1,y1) | d1 |
| p1 | No | S10 | — | — | ∞ |
| p2 | Yes | S12 | obj6 | (x2,y2) | d2 |
| p3 | No | S10 | — | — | ∞ |

FIG.33F

| PIXEL No. | END | SUBSPACE | OBJECT | I.C. | DISTANCE |
|---|---|---|---|---|---|
| p0 | Yes | S12 | obj5 | (x1,y1) | d1 |
| p1 | Yes | S10 | obj10 | (x3,y3) | d3 |
| p2 | Yes | S12 | obj6 | (x2,y2) | d2 |
| p3 | No | S10 | — | — | ∞ |

FIG.33G

| PIXEL No. | END | SUBSPACE | OBJECT | I.C. | DISTANCE |
|---|---|---|---|---|---|
| p0 | Yes | S12 | obj5 | (x1,y1) | d1 |
| p1 | Yes | S10 | obj10 | (x3,y3) | d3 |
| p2 | Yes | S12 | obj6 | (x2,y2) | d2 |
| p3 | Yes | — | — | — | ∞ |

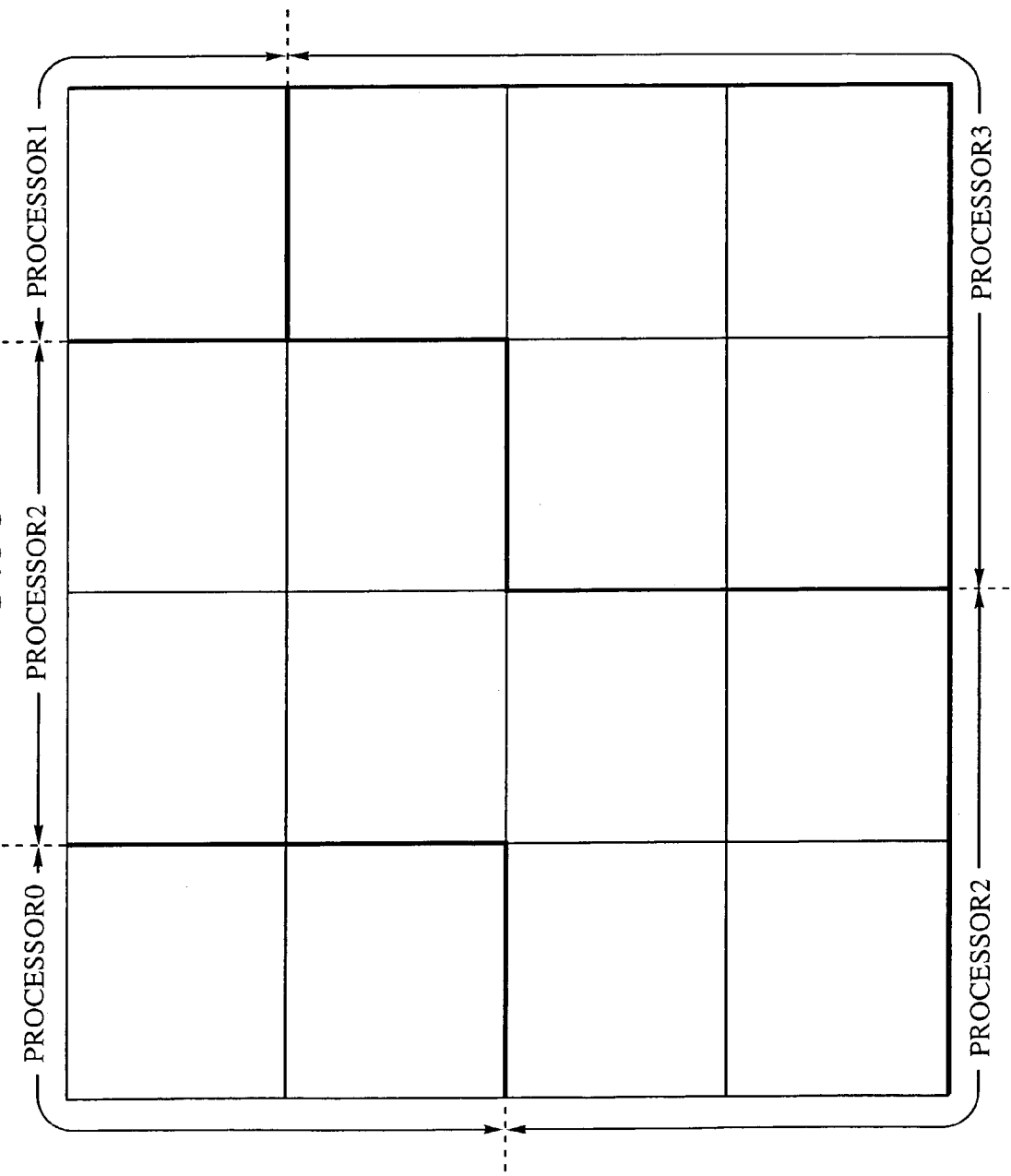

IMAGE PROCESSING UNIT, IMAGE PROCESSING SYSTEM USING THE SAME, AND IMAGE PROCESSING METHOD

BACKGROUND OF THE INVENTION

1. Field of the Invention

The present invention relates to an image processing unit for generating three-dimensional computer graphics and, more particularly, an image processing unit for performing the image processing in parallel by using a plurality of computers, an image processing system using this image processing unit, and an image processing method.

2. Description of the Related Art

The image process in which characters, still pictures, and moving pictures (animation) are processed by the computer is a process to take a very heavy load because of the size of image data. Therefore, the image process such as the rendering process, or the like need an expensive equipment such as a super computer, a high end workstation, etc.

Meanwhile, the image process in which a three-dimensional object is divided into polygons and then the drawing is performed using such polygons as a process unit can be achieved as a low cost system. However, if it is tried to draw an image which has a good surface quality with the high definition, reflection and refraction of the ray, motion of particles of the smoke, etc. must be reproduced. In other words, in order to draw the object as if it exists actually in a three-dimensional space, while taking account of arrangement of the object (a part of the remotely located object is hidden by a nearly located object), adjustment of the ray (portions faced to the light source are bright, but portions located oppositely to the light source are dark), quality of material on the object (the specular surface can reflect the ray emitted from the light source, but the transparent object can transmit the ray), etc., it must be calculated how the object can be seen based on above circumstances. As a result, an expensive system or an enormous computing time are needed after all.

In recent years, it has been strongly desired that the three-dimensional graphics having the good surface quality with the high definition, which have not been achieved up to now unless the expensive super computer or the expensive workstation is employed, should be implemented by the low cost system.

SUMMARY OF THE INVENTION

The present invention has been made in view of the above circumstances, and it is an object of the present invention to provide an image processing unit which is capable of achieving a higher speed and a higher efficiency in a rendering process and also implementing a low cost system.

It is another object of the present invention to provide an image processing system which includes a plurality of image processing units which can achieve a higher speed and a higher efficiency in an image process, and implements a low cost system.

It is still another object of the present invention to provide an image processing method which is capable of achieving a higher speed and a higher efficiency in a rendering process and also implementing a low cost system.

In order to achieve the above objects, a first aspect of the present invention is that an image processing unit comprises a main storing portion for storing information of three-dimensional objects; a plurality of calculating portions for processing images based on three-dimensional object information which are read from the main storing portion; and a hierarchical storing portion having a plurality of hierarchies, and connected between the main storing portion and the plurality of calculating portions to store a part of information at a lower level into a higher level sequentially; wherein image processing by the plurality of calculating portions are performed in parallel.

A second aspect of the present invention is that, in the image processing unit according to the first aspect, the information of the three-dimensional object are stored in the main storing portion in a situation that a space containing the three-dimensional object is divided into a plurality of small spaces which are composed of the plurality of hierarchies. And, the three-dimensional object exists in a four-dimensional space which is defined by three-dimensional coordinate axes and a time axis, and is composed of at least one of a first plane figure defined by a plurality of points, a first solid figure defined by a combination of a plurality of second plane figures defined by a plurality of points, and a second solid figure defined by at least one function.

A third aspect of the present invention is that, in the image processing unit according to the first aspect, a storing portion constituting an uppermost level of the hierarchical storing portion is a plurality of dependent storing portions which are dependent on corresponding calculating portions and can be rapidly accessed. And, each of data areas of the dependent storing portions are logically or physically divided into an area for storing a hierarchical structure of a three-dimensional space and an area for storing the information of the three-dimensional object. Also, each of data areas of the dependent storing portions are physically divided into a first area for storing a hierarchical structure of a three-dimensional space and a second area for storing the information of the three-dimensional object, and the second area includes a memory portion for holding the information of the three-dimensional object, a table portion for indicating arrangement of the information of the three-dimensional object in the memory portion, and a control portion for replacing a part of the memory portion with a part of the main memory unless the information of the three-dimensional object requested by the corresponding calculating portions do not exist in the memory portion, and then reading requested information of the three-dimensional object.

A fourth aspect of the present invention is that, in the image processing unit according to the first aspect, the communication media which connects the plurality of image processing units mutually includes a queue means for combining these access requests if the plurality of calculating portions issue access requests to a same or neighboring access area.

A fifth aspect of the present invention is that an image processing method of executing intersection decision between a half-line passing from a viewpoint to one pixel on a screen and a three-dimensional object and executing an image process of the pixel based on a result of the intersection decision, comprises a first step of selecting one of a plurality of three-dimensional objects in a three-dimensional space and acquiring information of a selected three-dimensional object; a second step of executing the intersection decision of all pixels on the screen based on acquired information; and a third step of applying the first step and the second step to all three-dimensional objects in the three-dimensional space.

A sixth aspect of the present invention is that an image processing method of generating a continuous image of a three-dimensional object, comprises the steps of dividing one frame of a screen on which the continuous image is displayed; allocating a plurality of divided areas to a plurality of calculating portions; processing allocated areas in parallel by the plurality of calculating portions; and dividing one succeeding frame in response to a result of the process such that respective processing times of the plurality of calculating portions are made equal.

A seventh aspect of the present invention is that an image processing method of generating an image of a three-dimensional object, comprises the steps of dividing a screen on which the image is displayed; allocating a plurality of divided areas to a plurality of calculating portions; and parallel-processing allocated areas by the plurality of calculating portions; wherein, in the parallel-processing step, the calculating portion which has completed the process in an allocated area processes an unfinished area allocated to another calculating portion.

Other and further objects and features of the present invention will becomes obvious upon an understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 3 is a block diagram showing a hardware structure of an image processing unit according to the present invention;

FIG. 13 is a view showing an example of object data stored in an object data cache according to the third embodiment of the present invention;

FIG. 15A is a view showing a structure of a cache memory 76 shown in FIG. 14;

FIG. 15B is a view showing a structure of a cache table 78 shown in FIG. 14;

FIG. 18 is a view showing a plurality of object data stored in the object data cache according to the third embodiment of the present invention;

FIGS. 19A to 19E are views showing changes in contents of the cache memory and the cache table when the object data cache according to the third embodiment of the present invention stores the object data in FIG. 18;

FIG. 23 is a view showing a configuration of a queue system according to the fourth embodiment of the present invention;

FIGS. 33A to 33G are views showing change in the content of a status table upon executing the intersection decision in FIG. 32;

FIG. 35 is a view showing the number of the pixel blocks allocated to four processors in FIG. 34 after adjustment;

DESCRIPTION OF THE PREFERRED EMBODIMENTS

Figure 1:
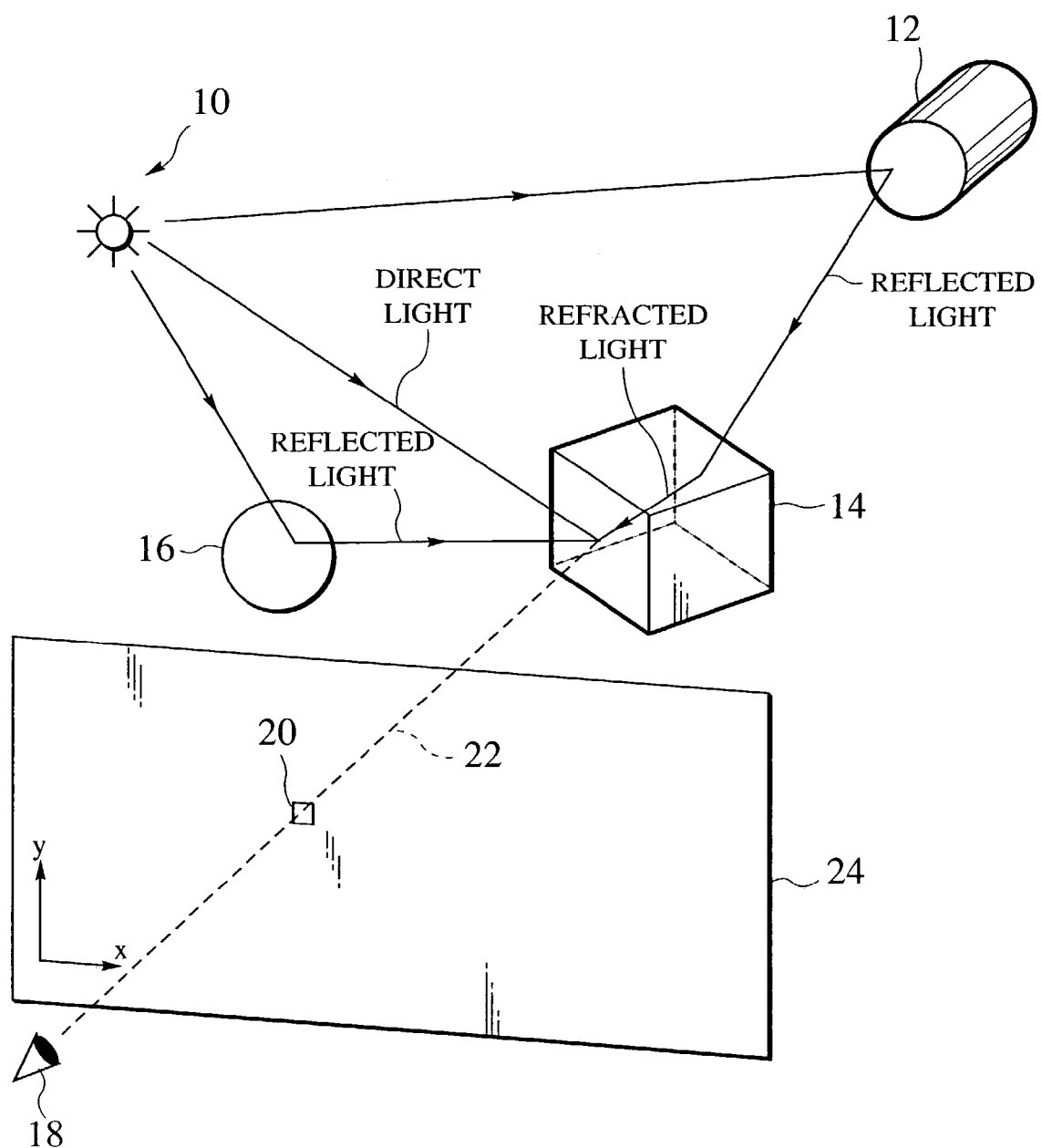
FIG. 1 is a conceptional view showing a ray tracing employed in an image processing method according to the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First of all, the rendering according to the present invention and the ray tracing as the algorithm for such rendering will be explained hereunder. Then, an image processing unit, an image processing system, and an image processing method according to the present invention will be explained with reference to seven embodiments hereunder.

Rendering and Ray Tracing

The image process according to the present invention employs the rendering as one of three-dimensional graphics process. Then, as the rendering approach, the image process according to the present invention employs the algorithm such as the ray tracing which has high parallelism in processes and which can be processed by using relatively small data. In the ray tracing, since the object such as a cube, a sphere, etc. are modeled by mathematical expressions, an amount of handled data can be reduced smaller than the case where each object is divided into polygons in the prior art. Also, since the ray is emitted from a viewpoint to respective pixels and also the saturation and the lightness of the object being intersected with the ray are calculated, the calculation of respective pixels can be performed independently.

FIG. 1 is a conceptional view showing a ray tracing employed in an image processing method according to the present invention. As shown in FIG. 1, a ray emitted from a light source 10 strikes various objects 12, 14, 16 and then absorbed, reflected, and refracted to reach an eye of the observer (viewpoint) 18. In the ray tracing, reflection, transmission, etc. by respective objects 12, 14, 16 are traced to retroact along the light beam (ray) passing predetermined pixels 20 from the viewpoint 18. Then, the firstly intersected object 14 is depicted as the pixel 20 to compute the final image. According to the ray tracing, intensity, transparency, reflection, etc. of respective objects 12, 14, 16 can be reproduced faithfully and thus the very real image can be depicted. However, because computation about all pixels is needed, an amount of calculation is increased rapidly if the number of objects is increased, etc., the ray tracing contains such a problem that a strong processing capability is requested.

Therefore, it may be discussed to construct the algorithm, which is called the ray tracing, by the hardware. A screen 24 shown in FIG. 1 is constructed by an infinite number of pixels 20, and such pixels 20 can be processed in parallel. However, if the pixels 20 are processed in parallel, the case where the same object data are needed simultaneously in computing different pixels 20 is caused. As a result, there is a possibility that competition of the memory accesses is caused. The present invention can achieve calculation of the pixels 20 and division/hierarchy of the memory structure by utilizing locality of the data such that the same object data are employed to calculate several pixels 20, i.e., locality of the memory access.

Figure 2:
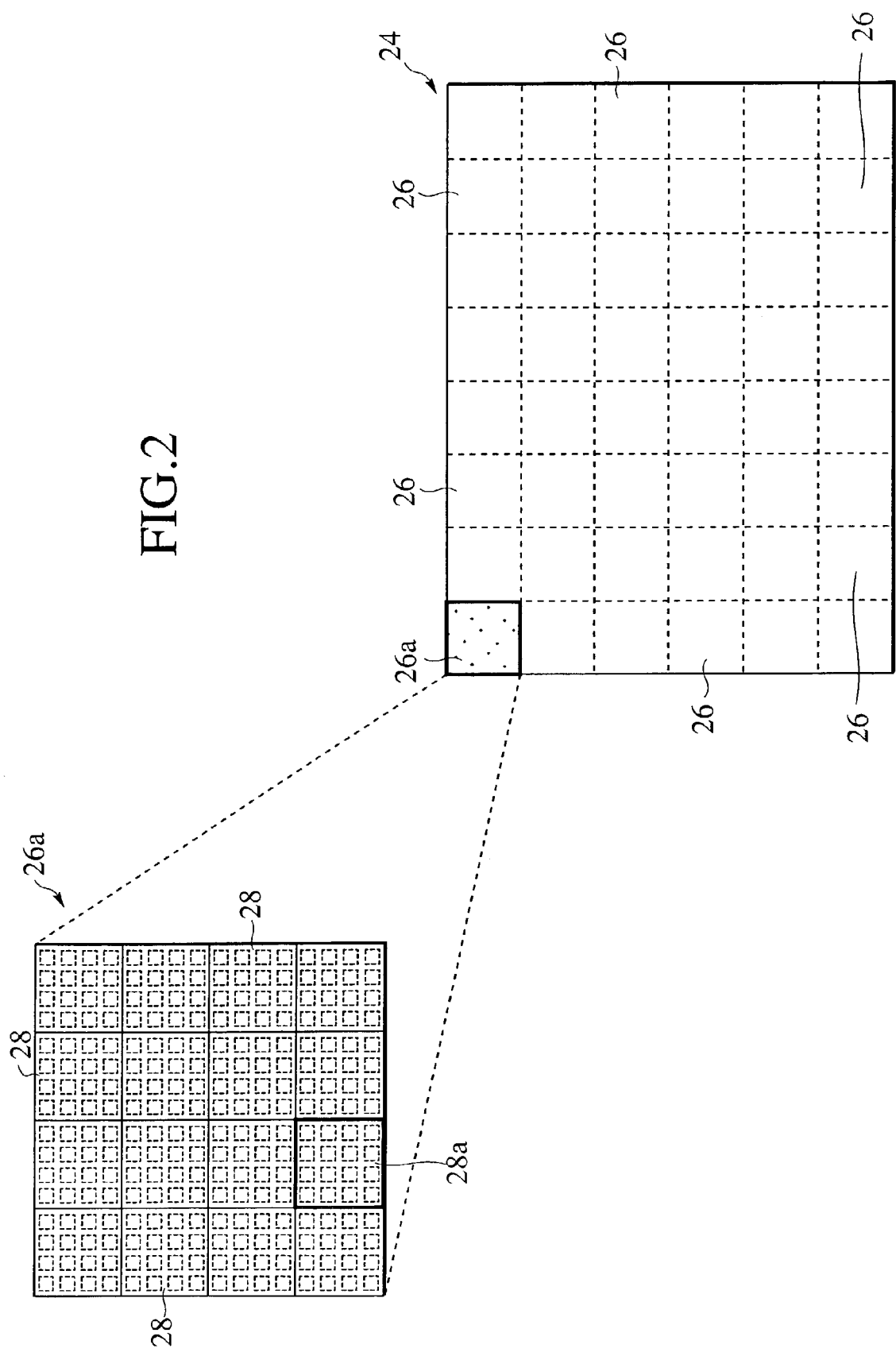
FIG. 2 is a view showing an example in which a screen 24 in FIG. 1 is hierarchically divided.

In the present invention, as shown in FIG. 2, first the screen 24 in FIG. 1 is divided equally into a plurality of subscreens 26. Then, each subscreen 26 is divided equally into a plurality of subsubscreens 28. Then, as shown in FIG. 3, a system consisting of a main memory 30 in which various object data are stored, and a plurality of processors 32-0, 32-1, 32-2, ..., 32-n is constructed. The processor 32-0 includes a plurality of processor cores 34-0, 34-1, ..., 34-m, local memories 40-0, 40-1, ..., 40-m which are dependent on the processor cores 34-0, 34-1, ..., 34-m respectively, and a shared memory 46-0 which are connected to the local memories 40-0, 40-1, ..., 40-m respectively to be shared with the processor cores 34-0, 34-1, ..., 34-m. The processor 32-1 includes a plurality of processor cores 36-0, 36-1, ..., 36-m, local memories 42-0, 42-1, ..., 42-m which are dependent on the processor cores 36-0, 36-1, ..., 36-m respectively, and a shared memory 46-1 which are connected to the local memories 42-0, 42-1, ..., 42-m respectively to be shared with the processor cores 36-0, 36-1, ..., 36-m. The processor 32-2 includes a plurality of processor cores 38-0, 38-1, ..., 38-m, local memories 44-0, 44-1, ..., 44-m which are dependent on the processor cores 38-0, 38-1, ..., 38-m respectively, and a shared memory 46-2 which are connected to the local memories 44-0, 44-1, ..., 44-m respectively to be shared with the processor cores 38-0, 38-1, ..., 38-m. The local memories 40-0, ..., 40-m, 42-0, ..., 42-m, 44-0, ..., 44-m have a capacity smaller than the main memory 30 and the shared memory 46-0, 46-1, 46-2 and can be accessed more rapidly than them. Although not shown, this is true of the processors 32-3, ..., 32-n in the following.

In turn, a plurality of subscreens 26 in FIG. 2 are allocated to the processors 32-0, 32-1, ..., 32-n in FIG. 3 respectively. Then, the subsubscreens 28 constituting the subscreen 26 are allocated to the processor cores 34-0, ..., 34-m, 36-0, ..., 36-m, 38-0, ..., 38-m in the processors 32-0, 32-1, ..., 32-*n* respectively. For example, a subscreen 26*a* in FIG. 2 is allocated to the processor 32-1 in FIG. 3, and then a subsubscreen 28*a* in the subscreen 26*a* is allocated to the processor core 36-0 in the processor 32-1. As described above, the processors 32-0, 32-1, ..., 32-*n* have the shared memories 46-0, 46-1, ..., 46-*n* respectively, and such shared memories 46-0, 46-1, ..., 46-*n* are shared with a plurality of processor cores 34-0, ..., 34-*m*, 36-0, ..., 36-*m*, 38-0, ..., 38-*m* in the processors 32-0, 32-1, ..., 32-*n*. The processors 32-0, 32-1, ..., 32-*n* read the object data, which are employed in processes in the allocated subscreen 26, from the main memory 30. Read data are stored in the shared memories 46-0, 46-1, ..., 46-*n* respectively. Then, the processor cores 34-0, ..., 34-*m*, 36-0, ..., 36-*m*, 38-0, ..., 38-*m* read the object data, which are employed in processes in the allocated subsubscreen 28, from the shared memories 46-0, 46-1, ..., 46-*n* respectively. Read data are stored in the local memories 40-0, ..., 40-*m*, 42-0, ..., 42-*m*, 44-0, ..., 44-*m* respectively.

According to such configuration, the number of times of data access of the processors 32-0, 32-1, ..., 32-*n* to main memory 30 can be suppressed. Hence, the process with a very high parallelism can be achieved. As a consequence, it is possible to perform the advanced image process effectively. In the above example, the explanation of the case where a plurality of processor cores 34-0, ..., 34-*m*, 36-0, ..., 36-*m*, 38-0, ..., 38-*m* exist in the processors 32-0, 32-1, ..., 32-*n* has been made, but their numbers may be set arbitrarily. For example, one processor core may be employed. The shared memories 46-0, 46-1, 46-2, ..., 46-*n* are not always needed. In other words, of course, it does not a matter that the local memories 40-0, ..., 40-*m*, 42-0, ..., 42-*m*, 44-0, ..., 44-*m* are directly connected to the main memory 30. In addition, a method of dividing the screen 24 in FIG. 1 is not limited to the example shown in FIG. 2. Any method may be employed if several groups of pixels in the screen 24 are allocated finally to one of the processor cores 34-0, ..., 34-*m*, 36-0, ..., 36-*m*, 38-0, ..., 38-*m*. For example, in FIG. 2, 4×4 pixels are allocated to the processor cores 34-0, ..., 34-*m*, 36-0, ..., 36-*m*, 38-0, ..., 38-*m* respectively. That is, each subsubscreen 28 is composed of 4×4 pixels.

Figure 4A:
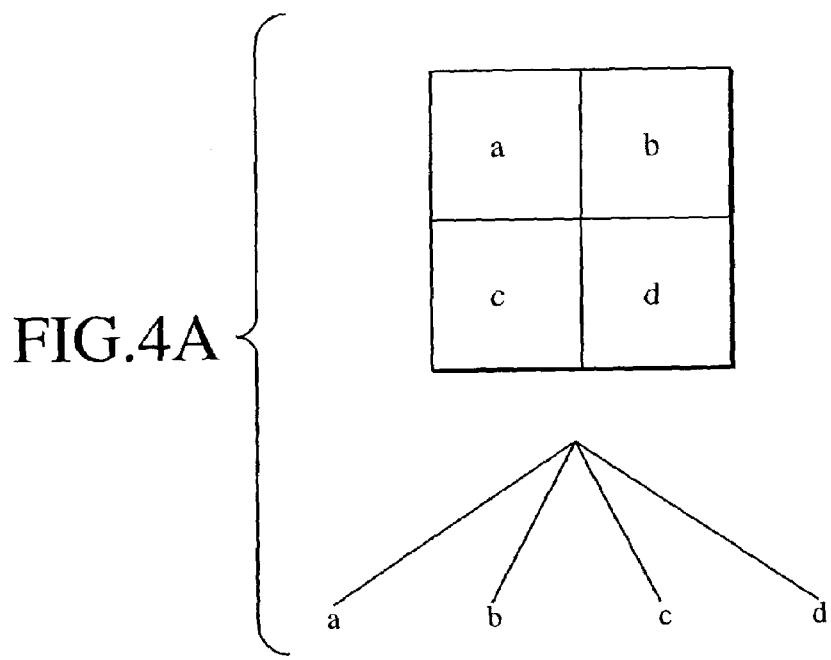
FIG. 4A is a conceptional view showing a two-dimensional octree.
Figure 4B:
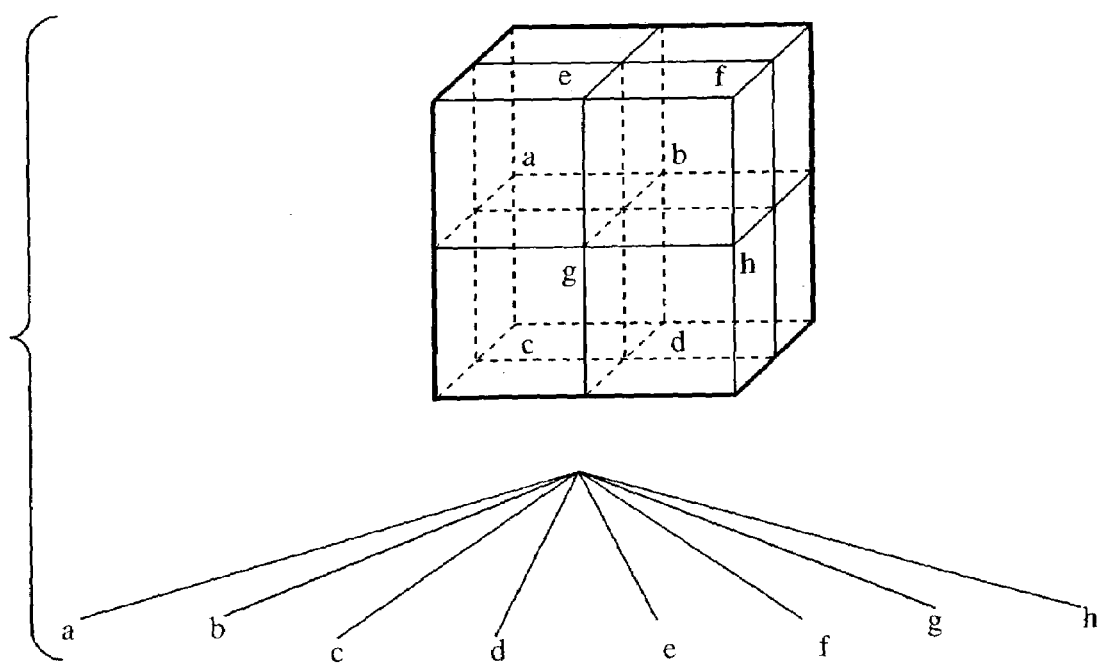
FIG. 4B is a conceptional view showing a three-dimensional octree.

Next, the case where an octree is employed in the above ray tracing will be explained hereunder. Such octree is a searching approach for executing intersection decision between the ray and respective objects effectively in the ray tracing. More particularly, the octree is such a space dividing approach that a three-dimensional object space serving as the processed object is divided based on predetermined dividing conditions to set the greater portion of the divided spaces into the state that no object is present, or set most of the divided spaces into the state that they are occupied by a single object. Examples of the octree are shown in FIGS. 4A and 4B. FIG. 4A shows a two-dimensional octree. FIG. 4B shows a three-dimensional octree. In FIG. 4A, subspaces a, b, c, d are formed by dividing equally the two-dimensional space into two equal parts in the x direction and the y direction respectively. In FIG. 4B, subspaces a, b, c, d, e, f, g, h are formed by dividing equally the three-dimensional space into two equal parts in the x direction, the y direction, and the z direction respectively. The number of division in each direction is not limited two, as described above, and other number may be employed. For simplicity of explanation, the case of the two-dimensional space shown in FIG. 4A will be explained in the following.

Figure 5:
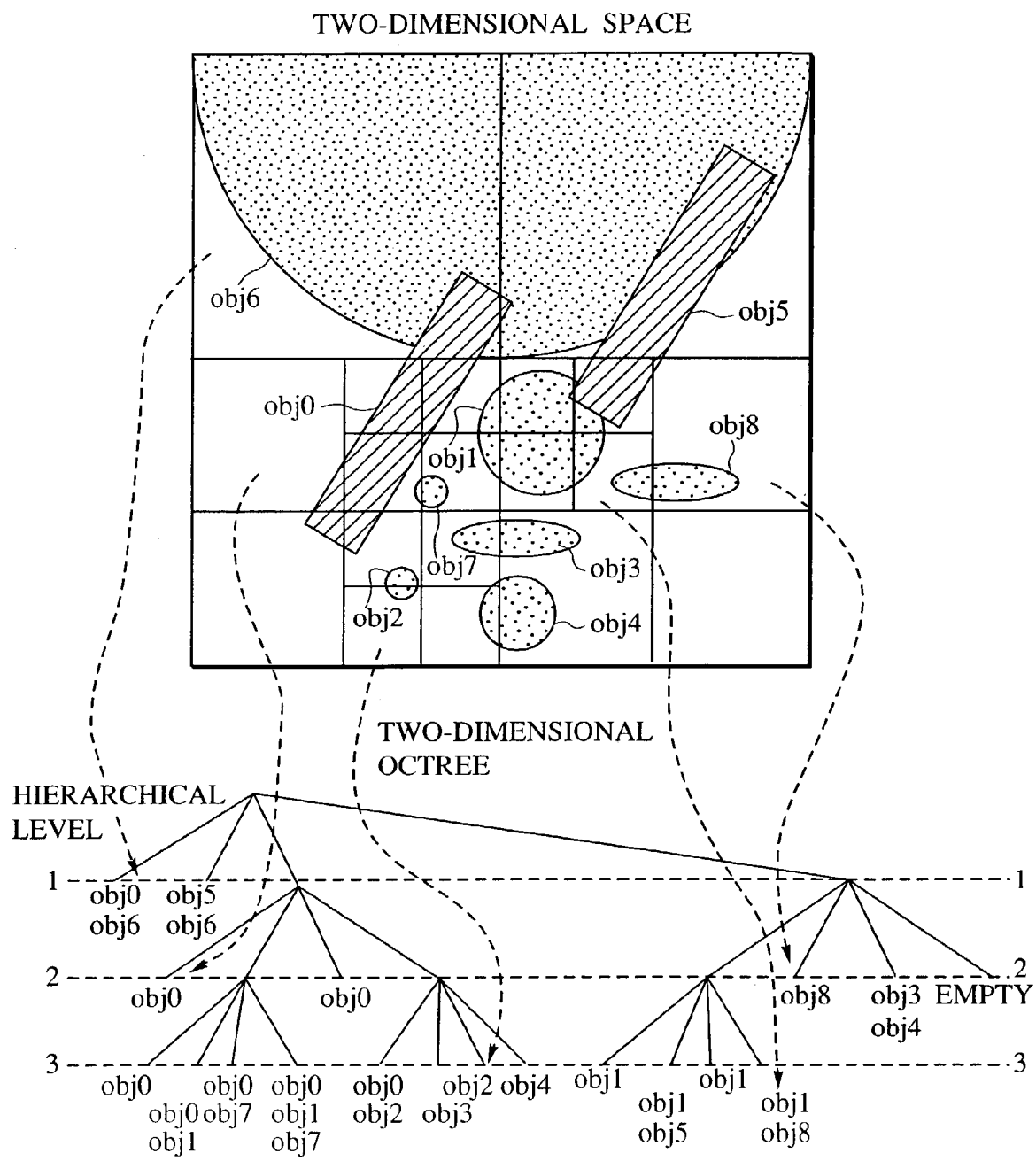
FIG. 5 is a view showing the case where the two-dimensional octree is applied to a two-dimensional space in which nine objects (obj0, obj1, obj2, . . . , obj8) are present.

FIG. 5 shows the case where the two-dimensional octree is applied to the two-dimensional space in which nine objects (obj0, obj1, obj2, ..., obj8) are present. Division of the two-dimensional space is based on following conditions:
 (1) three objects or more are present in the subspace, and
 (2) divided hierarchies are less than two levels.

Figure 6:
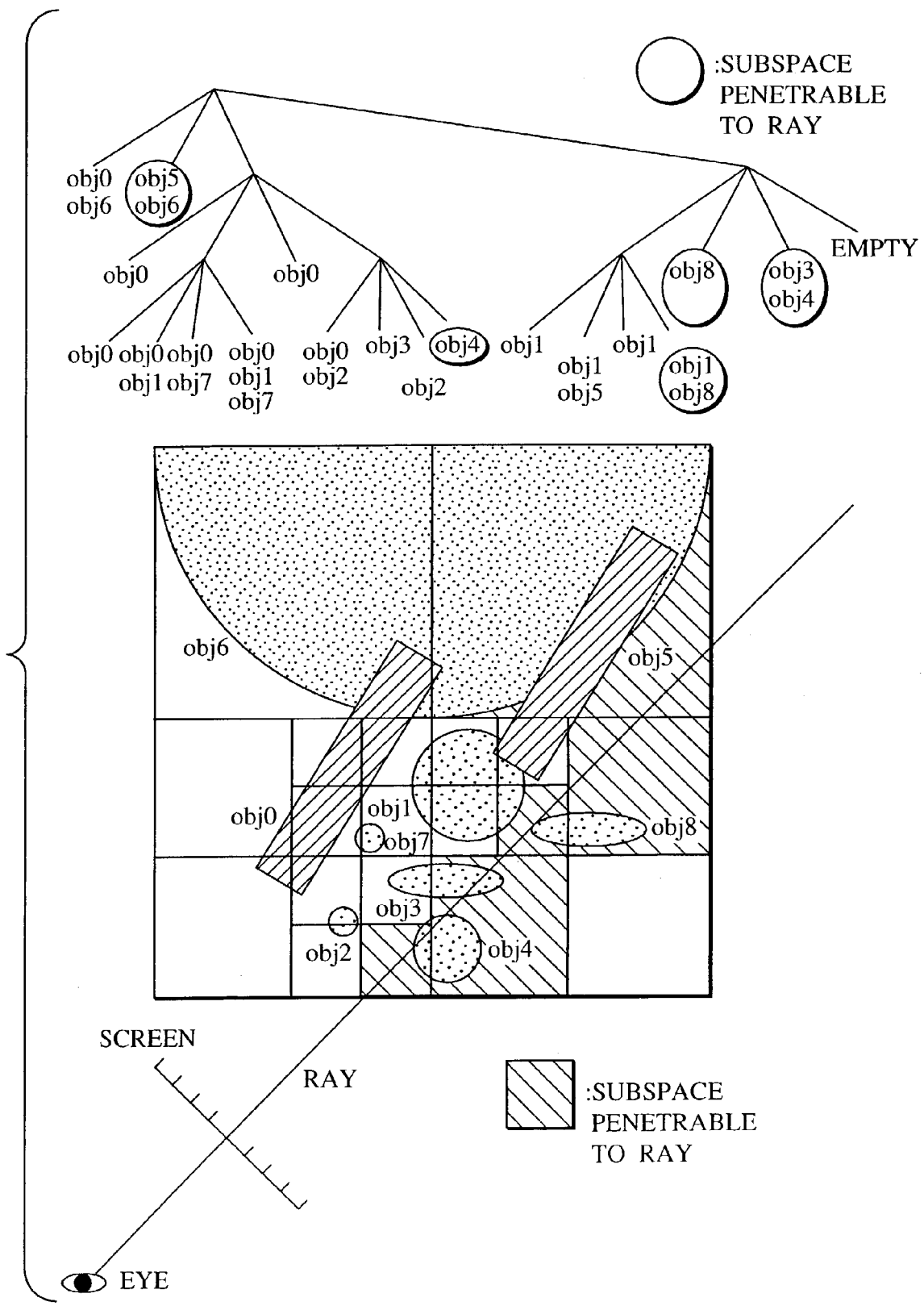
FIG. 6 is a view showing the case where the two-dimensional space having a hierarchical structure shown in FIG. 5 is applied to the ray tracing.

The present invention can achieve effective data access by providing the correspondence between the hierarchically divided spaces in FIG. 5 and a memory structure of the system in FIG. 3. An example in which the two-dimensional space having a hierarchical structure shown in FIG. 5 is applied to the ray tracing is shown in FIG. 6. Respective objects are modeled by mathematical expressions in the ray tracing. Accordingly, an amount of data is increased in proportion to not the size of the objects but the number of objects which exist in the space as the processed object. In this case, the number of objects which occupies the subspaces can be reduced as small as possible, ideally into one, by using the above octree. That is, since an amount of data of objects which exist in the subspaces can be reduced, overall data of the object in the subspaces can be stored in the local memories 40-0, ..., 40-*m*, 42-0, ..., 42-*m*, 44-0, ..., 44-*m*. Therefore, the processor cores 34-0, ..., 34-*m*, 36-0, ..., 36-*m*, 38-0, ..., 38-*m* can load previously the object data, which are necessary for calculation of the allocated pixels, into the local memories 40-0, ..., 40-*m*, 42-0, ..., 42-*m*, 44-0, ..., 44-*m* respectively. In addition, unless the data which are requested by the processor cores 34-0, ..., 34-*m*, 36-0, ..., 36-*m*, 38-0, ..., 38-*m* are not stored in the dependent local memories 40-0, ..., 40-*m*, 42-0, ..., 42-*m*, 44-0, ..., 44-*m*, i.e., if the cache miss is generated, the processor cores 34-0, ..., 34*m*, 36-0, ..., 36-*m*, 38-0, ..., 38-*m* may read necessary data from the shared memories 46-0, 46-1, ..., 46-*n*. This is because the object data in the upper level space are stored in the shared memories 46-0, 46-1, ..., 46-*n*. According to the present invention, the intersection decision can be achieved effectively at the higher speed by acquiring the object data effectively.

First Embodiment

Figure 7:
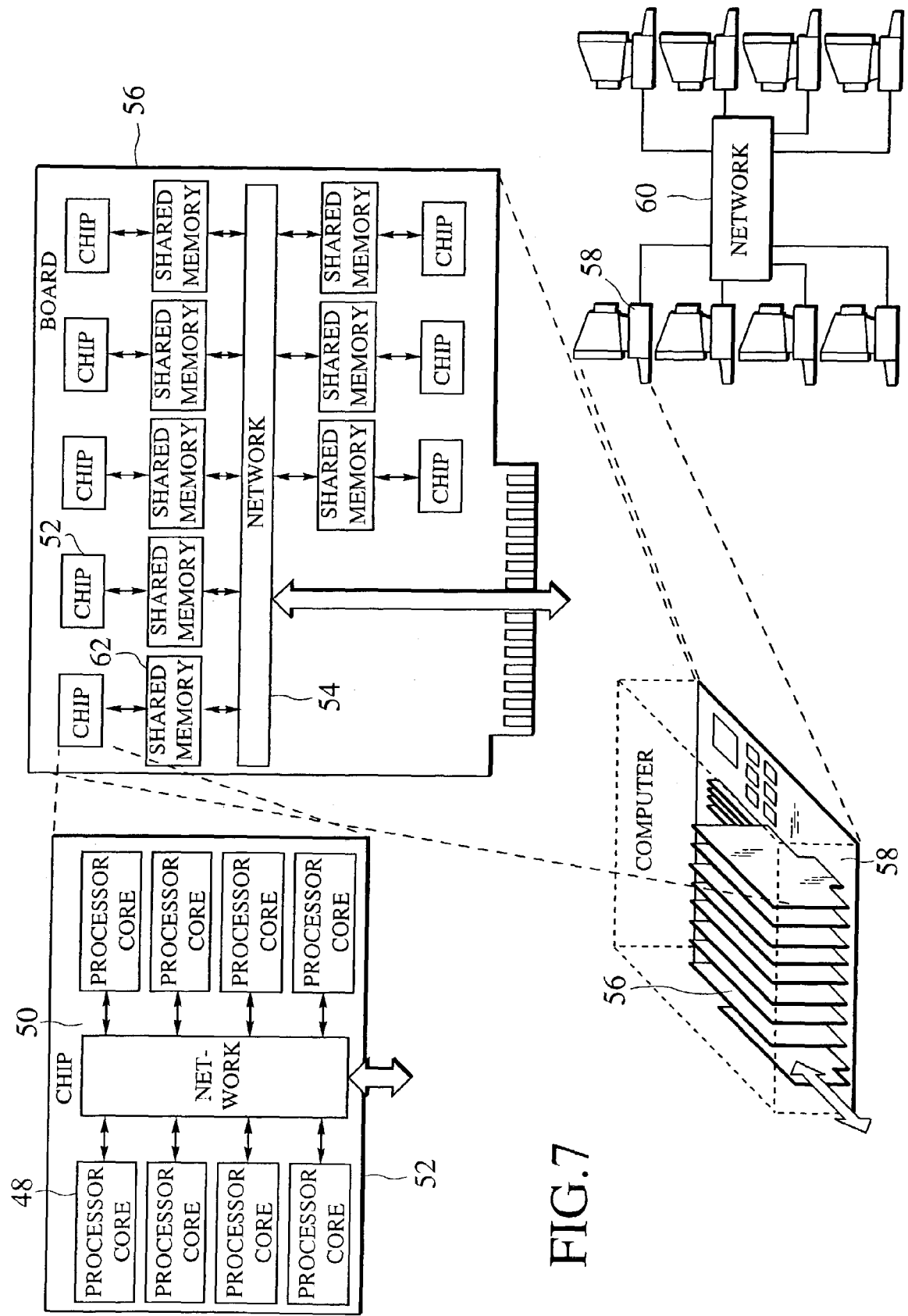
FIG. 7 is a view showing a configuration of an image processing system according to a first embodiment of the present invention.

FIG. 7 is a view showing a configuration of an image processing system according to a first embodiment of the present invention. As shown in FIG. 7, the image processing system according to the first embodiment of the present invention includes a plurality of chips 52, each has a plurality of processor cores 48 which are connected mutually via a network 50 to perform the image processing. Also, such image processing system includes a plurality of boards 56, each has a plurality of chips 52 which are connected mutually via a network 54. In addition, such image processing system includes a plurality of computers 58, each has a plurality of boards 56 which are connected mutually via a bus (not shown). The computers 58 are connected via a network 60. Each processor core 48 has a dependent local memory (not shown). Each chip 52 has a dependent shared memory 62 which is shared by a plurality of processor cores 48 in the chip 52. The three-dimensional space as the processed object is formed as a hierarchical structure by the above octree. Each shared memory 62 stores hierarchical object data.

In the image processing system according to the first embodiment of the present invention, if one frame of the image is drawn, for example, such one frame of the image is divided every predetermined area. The drawing process in each divided subarea is allocated to each computer 58. The subarea allocated to each computer 58 is then divided into subsubareas. The drawing process in each divided subsubarea is allocated to each board 56. The allocated subsubarea is then divided into subsubsubareas in the board 56. The drawing process in each divided subsubsubarea is allocated to each processor core 48. In this manner, in the image processing system according to the first embodiment of the present invention, one frame of the image is divided as a small area, i.e., a group of several pixels, then the drawing process of the small area is distributed to each processor core 48, and then the drawing process in the small area is performed in parallel by the processor core 48. Therefore, the drawing process for the entire one frame of the image can be carried out effectively at a high speed. Although the case where one frame of the image is assigned to a plurality of processor cores 48 to perform the drawing process is set forth in the above example, the present invention is not limited to this example. For example, if the moving picture is processed, the drawing process of one frame of the image can be allocated to each computer 58.

Figure 8:
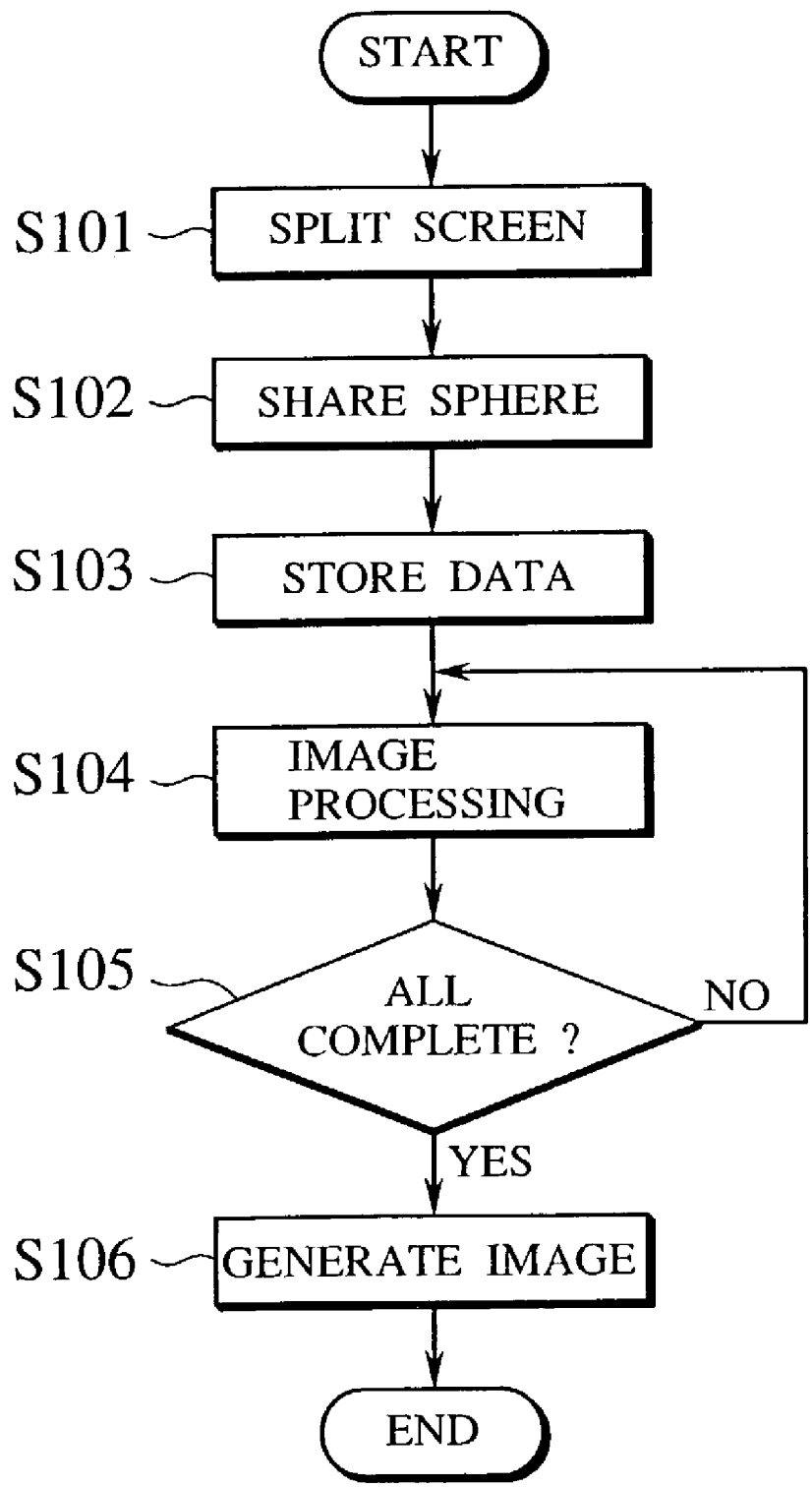
FIG. 8 is a flowchart showing process procedures in an image processing method according to the first embodiment of the present invention.

The image processing system according to the first embodiment of the present invention executes the image process as described in the following, for example. FIG. 8 is a flowchart showing process procedures in an image processing method according to the first embodiment of the present invention. As shown in FIG. 8, first the image as the processed object is divided sequentially, as exemplified in FIG. 2 (step S101). Then, the drawing process in the divided area is distributed to the processor core 48 (step S102). The processor core 48 reads the object data which are necessary for the drawing process in the divided area from the main memory or the shared memory, and then stores the read data in the dependent local memory (step S103). Then, the processor core 48 carries out the drawing process in the allocated area. This drawing process is carried out in parallel by each processor core 48 (step S104). If the drawing process is finished in all processor cores 48 (step S105 YES), the image as the processed object is generated based on drawing results in all areas (step S106). When such generated image is displayed on a display device or stored in a recording medium as image data, the image process is ended.

Second Embodiment

Next, a second embodiment of the present invention will be explained hereinbelow. The second embodiment of the present invention shows an example in which the image as the processed object is a moving picture (animation) whose contents are changed relative to a time, unlike the still picture. The animation is generated by displaying a series of continuous images on a screen. Therefore, the rendering is applied to a plurality of frames at slightly different times respectively. In addition, division of the octree must be performed every frame. In other words, in the animation, position, form, appearance, disappearance, etc. of the three-dimensional object are changed according to the change of the frame. Therefore, the space division must be performed again every time when the frame is changed. As a result, subspace information must be transferred again from the main memory, etc. to the local memories at each time when the frame is changed.

In the second embodiment of the present invention, object information in which time information are added to information of the three-dimensional object to be depicted (referred to as "four-dimensional object information" hereinafter) are generated. Based on such four-dimensional object information, the space division is performed by using the octree in view of the time axis. Since the space division is performed while taking the time axis into consideration, the space division needed every frame change can be reduced as small as possible. As a result, the higher speed of the overall process can be achieved by reducing the number of times of the information transfer from the main memory, etc. to the local memories. The second embodiment of the present invention will be explained in detail hereunder.

To begin with, the four-dimensional object information according to the second embodiment of the present invention will be explained. The four-dimensional object information are defined in a four-dimensional space which is specified within the x coordinate, the y coordinate, the z coordinate, and the t coordinate. In the four-dimensional object information, the time information is added to the well-known three-dimensional object information. For example, followings may listed as the time information.

(1) Expression x coordinate: $x=3 \cdot t+4$ y coordinate: $y=4 \cdot t+5$ z coordinate: $z=5 \cdot t+6$ domain of time: $0 \leq t \leq 10$ where t is a parameter indicating a time. This is the same in the following.

(2) Expression $$x \cdot x + y \cdot y + z \cdot z + t \cdot t = 10 \cdot 10$$

domain of time: $-10 \leq t \leq 10$ (3) Sequence $\{t:x\}=\{0:-1, 1:2, 2:4\}$ $\{t:y\}=\{0:0, 1:-1, 2:-2\}$ $\{t:z\}=\{0:2, 1:2, 2:5\}$ Where undefined times are interpolated by the well-known rule such as linear interpolation, spline interpolation, etc. if the time information are stored by the sequence. In the above example, t=0.5 is the undefined time, for example. In this case, all times can be expressed by the sequence without interpolation.

Then, for example, followings may listed as the four-dimensional object information.

(1) Moving triangle (called "obj0" hereinafter)

[vertex 1]

x coordinate: $x=1$ y coordinate: $y=1$ z coordinate: $z=1-t$

[vertex 2]

x coordinate: $x=2$ y coordinate: $y=1$ z coordinate: $z=1-t$

[vertex 3]

x coordinate: $x=1$ y coordinate: $y=2$ z coordinate: $z=1-t$ where a domain of time is $0.5 \leq t \leq 2$.

(2) Sphere which becomes small gradually and is disappeared (called "obj1" hereinafter)

$$x \cdot x + y \cdot y + z \cdot z + t \cdot t = 1$$

where a domain of time is $0 \leq t \leq 1$.

(3) Moving sphere (called "obj2" hereinafter)

$$(x-1.1) \cdot (x-1.1) + (y-1.1) \cdot (y-1.1) + (z-((-t/100)-1.5)) \cdot (z-((-t/100)-1.5)) = 0.01 \cdot 0.01$$

where a domain of time is $0 \leq t \leq 2$.

(4) Moving tetrahedron (called "obj3" hereinafter)

[vertex 1]

x coordinate: $\{t:x\}=\{-2:-1, 2:-1\}$ y coordinate: $\{t:y\}=\{-2:-1, 2:-1\}$ z coordinate: $\{t:z\}=\{-2:-1, 2:-0.5\}$

[vertex 2]
  x coordinate: {t:x}={-2:-2, 2:-2}
  y coordinate: {t:y}={-2:-1, 2:-1}
  z coordinate: {t:z}={-2:-1, 2:-0.5}
[vertex 3]
  x coordinate: {t:x}={-2:-1, 2:-1}
  y coordinate: {t:y}={-2:-2, 2:-2}
  z coordinate: {t:z}={-2:-1, 2:-0.5}
[vertex 4]
  x coordinate: {t:x}={-2:-1, 2:-1}
  y coordinate: {t:y}={-2:-1, 2:-1}
  z coordinate: {t:z}={-2:-2, 2:-1.5}
  where the linear interpolation may be applied to a domain between a time=-2 and a time=2.

Figure 9:
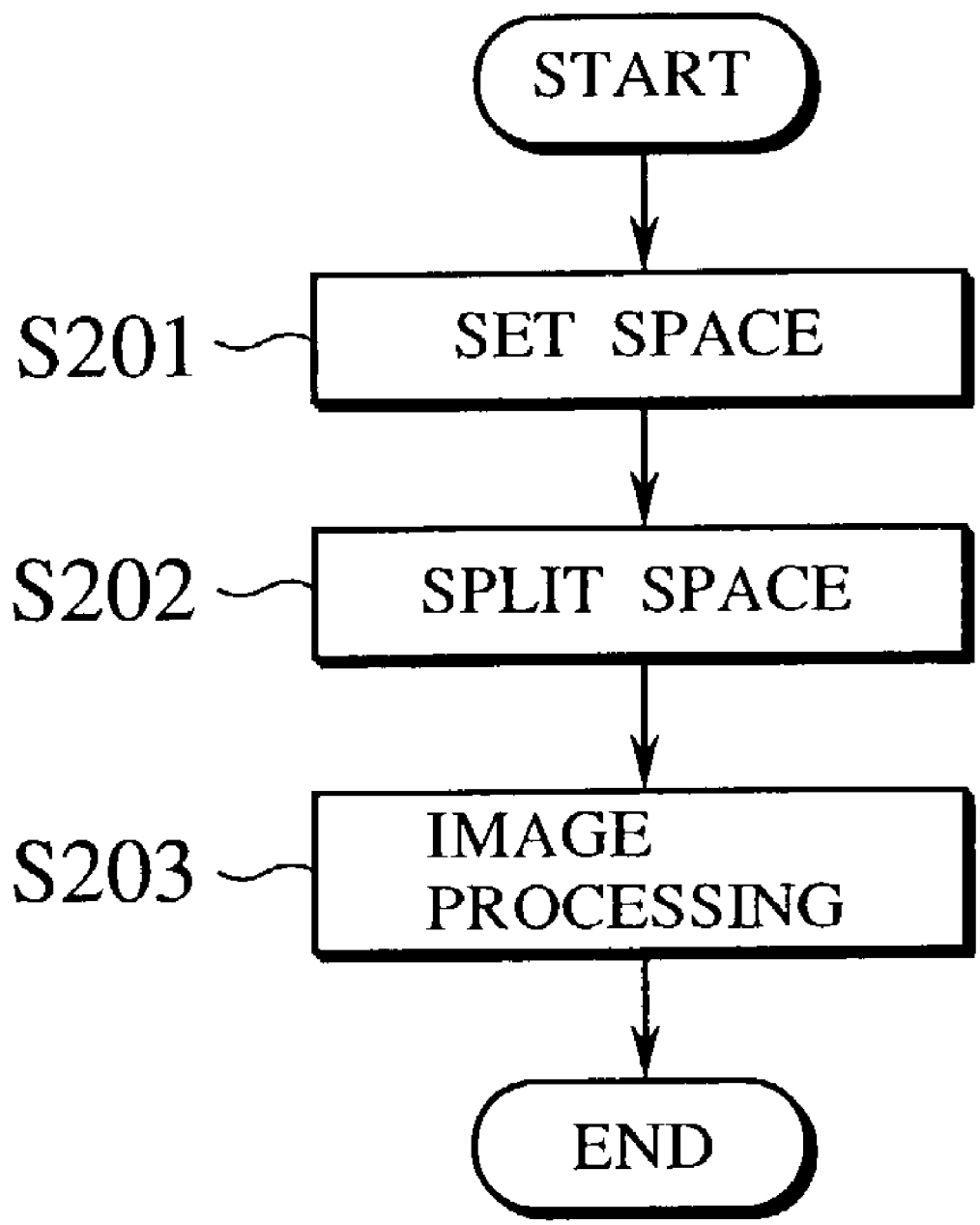
FIG. 9 is a flowchart showing process procedures in an image processing method according to a second embodiment of the present invention.

Next, the space division of the four-dimensional space in which the above four-dimensional objects (obj0, obj1, obj2, obj3) are present will be explained hereunder. FIG. 9 is a flowchart showing process procedures in an image processing method according to the second embodiment of the present invention. As shown in FIG. 9, first the setting of the four-dimensional space is carried out. Such setting of the four-dimensional space is carried out such that all the above four-dimensional objects are contained in the four-dimensional space (step S201). As the four-dimensional space (initial value) in which all four-dimensional objects are contained, the following may be considered, for example.
  $-2 \leq x \leq 2, -2 \leq y \leq 2, -2 \leq z \leq 2, -2 \leq t \leq 2$ Then, the space division of the four-dimensional space which has been set is carried out (step S202). The space division is performed based on predetermined division conditions. As the division conditions, followings may be considered, for example.

(1) The objects in excess of a predetermined number are present in the space as the divided object.
(2) The divided hierarchies do not exceed a maximum hierarchical dividing level.

Suppose that the "predetermined number" is "3" and the "maximum hierarchical dividing level" is "3". Four objects (obj0, obj1, obj2, obj3) as above exist in the four-dimensional space which has been set as the initial value. Of course, no division is performed. That is, the hierarchical dividing level is 0. Accordingly, the above division conditions are satisfied and thus the space division is carried out. If the above four-dimensional space is equally divided into two equal parts along the x-axis, the y-axis, the z-axis, and the t-axis respectively, following sub temporal spaces are generated.

sub temporal space 0: $0 \leq x \leq 2, 0 \leq y \leq 2, 0 \leq z \leq 2, 0 \leq t \leq 2$
  sub temporal space 1: $-2 \leq x \leq 0, 0 \leq y \leq 2, 0 \leq z \leq 2, 0 \leq t \leq 2$
  sub temporal space 2: $0 \leq x \leq 2, -2 \leq y \leq 0, 0 \leq z \leq 2, 0 \leq t \leq 2$
  sub temporal space 3: $-2 \leq x \leq 0, -2 \leq y \leq 0, 0 \leq z \leq 2, 0 \leq t \leq 2$
  sub temporal space 4: $0 \leq x \leq 2, 0 \leq y \leq 2, -2 \leq z \leq 0, 0 \leq t \leq 2$
  sub temporal space 5: $-2 \leq x \leq 0, 0 \leq y \leq 2, -2 \leq z \leq 0, 0 \leq t \leq 2$
  sub temporal space 6: $0 \leq x \leq 2, -2 \leq y \leq 0, -2 \leq z \leq 0, 0 \leq t \leq 2$
  sub temporal space 7: $-2 \leq x \leq 0, -2 \leq y \leq 0, -2 \leq z \leq 0, 0 \leq t \leq 2$
  sub temporal space 8: $0 \leq x \leq 2, 0 \leq y \leq 2, 0 \leq z \leq 2, -2 \leq t \leq 0$
  sub temporal space 9: $-2 \leq x \leq 0, 0 \leq y \leq 2, 0 \leq z \leq 2, -2 \leq t \leq 0$
  sub temporal space 10: $0 \leq x \leq 2, -2 \leq y \leq 0, 0 \leq z \leq 2, -2 \leq t \leq 0$
  sub temporal space 11: $-2 \leq x \leq 0, -2 \leq y \leq 0, 0 \leq z \leq 2, -2 \leq t \leq 0$
  sub temporal space 12: $0 \leq x \leq 2, 0 \leq y \leq 2, -2 \leq z \leq 0, -2 \leq t \leq 0$
  sub temporal space 13: $-2 \leq x \leq 0, 0 \leq y \leq 2, -2 \leq z \leq 0, -2 \leq t \leq 0$
  sub temporal space 14: $0 = x \leq 2, -2 \leq y \leq 0, -2 \leq z \leq 0, -2 \leq t \leq 0$
  sub temporal space 15: $-2 \leq x \leq 0, -2 \leq y \leq 0, -2 \leq z 0, -2 \leq t \leq 0$ Out of the generated sub temporal spaces 1 to 15, the following sub temporal spaces contain at least one of objects (obj0, obj1, obj2, obj3).
  sub temporal space 0: obj0, obj1
  sub temporal space 1: obj1
  sub temporal space 2: obj1
  sub temporal space 3: obj1
  sub temporal space 4: obj0, obj1, obj2
  sub temporal space 5: obj1
  sub temporal space 6: obj1
  sub temporal space 7: obj1, obj3
  sub temporal space 15: obj3

As evident from the above, the sub temporal space 4 contains three objects and has the hierarchical dividing level of "1". That is, the division conditions are satisfied in the sub temporal space 4. Accordingly, the space division is carried out in the sub temporal space 4. If the sub temporal space 4 is equally divided into two equal parts along the x-axis, the y-axis, the z-axis, and the t-axis respectively, following sub temporal spaces are further generated.

sub temporal space 4-0: $1 \leq x \leq 2, 1 \leq y \leq 2, -1 \leq z \leq 0, 1 \leq t \leq 2$
  sub temporal space 4-1: $0 \leq x \leq 1, 1 \leq y \leq 2, -1 \leq z \leq 0, 1 \leq t \leq 2$
  sub temporal space 4-2: $1 \leq x \leq 2, 0 \leq y \leq 0, -1 \leq z \leq 0, 1 \leq t \leq 2$
  sub temporal space 4-3: $0 \leq x \leq 1, 0 \leq y \leq 1, -1 \leq z \leq 0, 1 \leq t \leq 2$
  sub temporal space 4-4: $1 \leq x \leq 2, 1 \leq y \leq 2, -2 \leq z \leq -1, 1 \leq t \leq 2$
  sub temporal space 4-5: $0 \leq x \leq 1, 1 \leq y \leq 2, -2 \leq z \leq -1, 1 \leq t \leq 2$
  sub temporal space 4-6: $1 \leq x \leq 2, 0 \leq y \leq 1, -2 \leq z \leq -1, 1 \leq t \leq 2$
  sub temporal space 4-7: $0 \leq x \leq 1, 0 \leq y \leq 1, -2 \leq z \leq -1, 1 \leq t \leq 2$
  sub temporal space 4-8: $1 \leq x \leq 2, 1 \leq y \leq 2, -1 \leq z \leq 0, 0 \leq t \leq 1$
  sub temporal space 4-9: $0 \leq x \leq 1, 1 \leq y \leq 2, -1 \leq z \leq 0, 0 \leq t \leq 1$
  sub temporal space 4-10: $1 \leq x \leq 2, 0 \leq y \leq 1, -1 \leq z \leq 0, 0 \leq t \leq 1$
  sub temporal space 4-11: $0 \leq x \leq 1, 0 \leq y \leq 1, -1 \leq z \leq 0, 0 \leq t \leq 1$
  sub temporal space 4-12: $1 \leq x \leq 2, 1 \leq y \leq 2, -2 \leq z \leq 1, 0 \leq t \leq 1$
  sub temporal space 4-13: $0 \leq x \leq 1, 1 \leq y \leq 2, -2 \leq z \leq -1, 0 \leq t \leq 1$
  sub temporal space 4-14: $1 \leq x \leq 2, 0 \leq y \leq 1, -2 \leq z \leq -1, 0 \leq t \leq 1$
  sub temporal space 4-15: $0 \leq x \leq 1, 0 \leq y \leq 1, -2 \leq z \leq -1, 0 \leq t \leq 1$ Out of the generated sub temporal spaces 4-0 to 4-15, the following sub temporal spaces contain at least one of objects (obj0, obj1, obj2, obj3).

sub temporal space 4-0: obj0
sub temporal space 4-4: obj2
sub temporal space 4-8: obj0
sub temporal space 4-11: obj1
sub temporal space 4-12: obj2

As evident from the above, all the sub temporal spaces 4-0, 4-4, 4-8, 4-11, 4-12 contain only one object. Accordingly, the division conditions are not satisfied and thus the space division is ended.

Then, the image process is carried out by the rendering using the generated sub temporal spaces (step S203). Assume that the algorithm used in the rendering is the ray tracing. As shown in FIG. 6, the viewpoint and the screen are defined. Suppose that the viewpoint and the screen are not changed with the lapse of time. Here the viewpoint and the screen are defined as follows. The screen is defined by four points.

(1) viewpoint
  (x, y, z)=(1, 1, 4)
(2) Screen
  (x, y, z)=(1.1, 1.1, 3)
  (x, y, z)=(1.1, 0.9, 3)
  (x, y, z)=(0.9, 0.9, 3)
  (x, y, z)=(0.9, 1.1, 3)

Then, one point (called an A point hereinafter) is further defined on the defined screen. The sub temporal space in which a straight line connecting this A point and the viewpoint is passed is specified. For example, the A point has the following coordinates, for example.

A point coordinates: (x, y, z)=(1.01, 1.01, 3)

The straight line connecting this A point and the viewpoint passes through the sub temporal space 0, the sub temporal space 4, the sub temporal space 8, and the sub temporal space 12. Accordingly, the processor core to which the process of the pixel corresponding to the A point is allocated reads the object data of the sub temporal space 0, the sub temporal space 4, the sub temporal space 8, and the sub temporal space 12 from the main memory, etc. and stores them in the dependent local memory. Then, the processor core executes the drawing process of the pixel corresponding to the A point by using the object data stored in the local memory.

Here the above sub temporal spaces are divided based on the object information to which the time information is added. The sub temporal space 0, the sub temporal space 4, the sub temporal space 8, and the sub temporal space 12, through which the straight line connecting the A point and the viewpoint is passed, are employed according to the time. In other words, the sub temporal space 8 and the sub temporal space 12 are employed in $-2 \leq t \leq 0$, and the sub temporal space 0 and the sub temporal space 4 are employed in $0 \leq t \leq 2$. For example, if a time unit "1" consists of 60 frames, the transfer of the object data of the sub temporal space 8 and the sub temporal space 12 is executed in $-2 \leq t \leq 0$ (60×2=120 frames), and the transfer of the object data of the sub temporal space 0 and the sub temporal space 4 is executed in $0 \leq t \leq 2$ (60×2=120 frames). Therefore, the number of times of the data transfer is four times at most. In contrast, if the space division is tried again every frame and then the subspace information are transferred again from the main memory, etc. to the local memory, the number of times of the data transfer becomes very large. In other words, if the sub temporal space 0 and the sub temporal space 8 correspond to the subspace 0 and also the sub temporal space 4 and the sub temporal space 8 correspond to the subspace 4, the transfer of the object data of the subspace 0 and the subspace 4 is executed every frame of 120 frames in $-2 \leq t \leq 0$ (120 frames) and also the transfer of the object data of the subspace 0 and the subspace 4 is executed every frame of 120 frames in $0 \leq t \leq 2$ (120 frames). As a result, the number of times of the data transfer to the local memory becomes 480 times.

As described above, according to the second embodiment of the present invention, the number of times of the data transfer between the main memory and the local memory can be reduced when the animation is displayed. Thus, the higher speed of the image process can be achieved. Also, in the second embodiment of the present invention, the sub temporal space which is employed succeedingly can be predicted. Therefore, the sub temporal space information can be preloaded onto the local memory which is dependent to the processor, and thus the further higher speed of the image process can be achieved.

Figure 10:
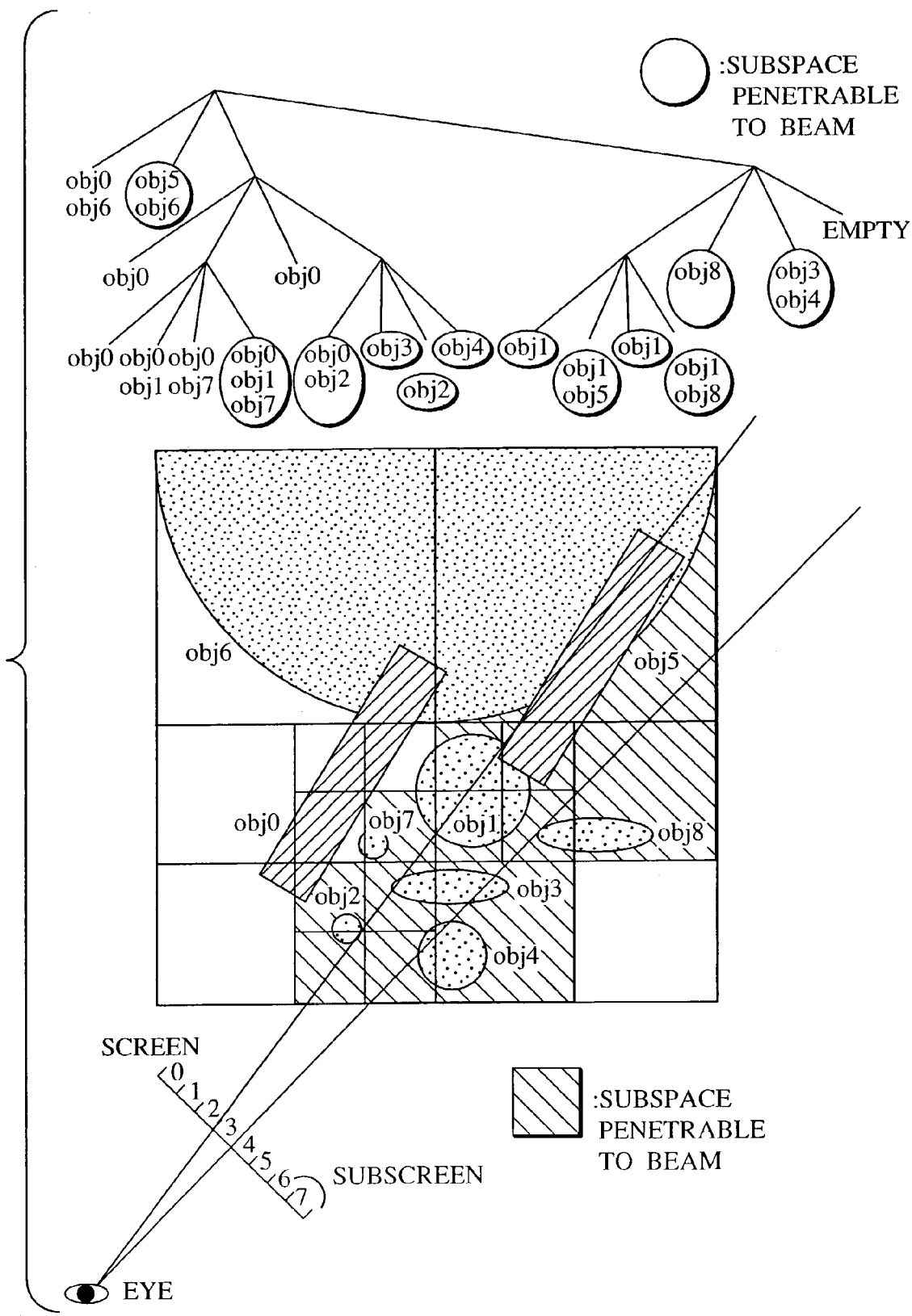
FIG. 10 is a view showing the case where the two-dimensional space having the hierarchical structure shown in FIG. 5 is applied to the beam tracing.

In the above second embodiment, explanation has been made by using the ray tracing as the algorithm employed in the rendering. But the present invention is not limited to such ray tracing. For example, the beam tracing may be employed as the algorithm. In the beam tracing, the screen is divided into a plurality of subscreens and then divided subscreens are allocated to the processors. The processor executes the image process of the allocated subscreens. An example in which the two-dimensional space having the hierarchical structure shown in FIG. 5 is applied to the beam tracing is shown in FIG. 10. In this example, the screen is divided into eight subscreens. For example, twelve subspaces are needed in the process of the subscreen 3.

If the beam tracing is employed in the rendering in step S203 in FIG. 9, the subspaces through which the beam is passed can be given as follows. The coordinates of the viewpoint and the screen are similar to the above. The subscreen is defined by four point (called "B point, C point, D point, E point" hereinafter) on the screen. Assume that, for example, the B point, the C point, the D point, and the E point have following coordinates.

B point coordinates: (x, y, z)=(1.01, 1.01, 3)
C point coordinates: (x, y, z)=(1.01, 1.02, 3)
D point coordinates: (x, y, z)=(1.02, 1.02, 3)
E point coordinates: (x, y, z)=(1.02, 1.01, 3)

Beams connecting the viewpoint and the B, C, D and E points are passed through the sub temporal space 0, the sub temporal space 4, the sub temporal space 8, and the sub temporal space 12.

In the second embodiment of the present invention, the bounding volume may be employed as the image generating approach. According to the ray tracing and the beam tracing, sometimes the object has a complicated form, or the intersection decision needs an enormous computing time. The bounding volume wraps the object having the complicated form in a simple object and then the intersection decision is applied to such simple object. As a result, reduction in the computing time can be achieved. Also, the motion blur approach may be utilized. The above sub temporal spaces can be utilized in this approach. Like the case where the rendering is used, reduction in the number of transfer times can be attained.

Third Embodiment

Next, a third embodiment of the present invention will be explained hereinbelow. The third embodiment of the present invention is associated with a structure of the processor core in the above first and second embodiments. If the three-dimensional object space is divided by using a searching tree such as the above octree, etc., the data which are necessary for the image process by the processor core are roughly classified into two groups. That is, data concerning to the hierarchical structure in the three-dimensional space (referred to as "hierarchical structure data" hereinafter) and data concerning to the object (referred to as "object data" hereinafter). As described in the first and second embodiments, the processor core stores the data necessary for the image process in the allocated area into the dependent local memory. The processor core according to the third embodiment of the present invention does not store both the hierarchical structure data and the object data in the same local memory, but stores them separately in different local memories which are logically or physically independent.

Figure 11A:
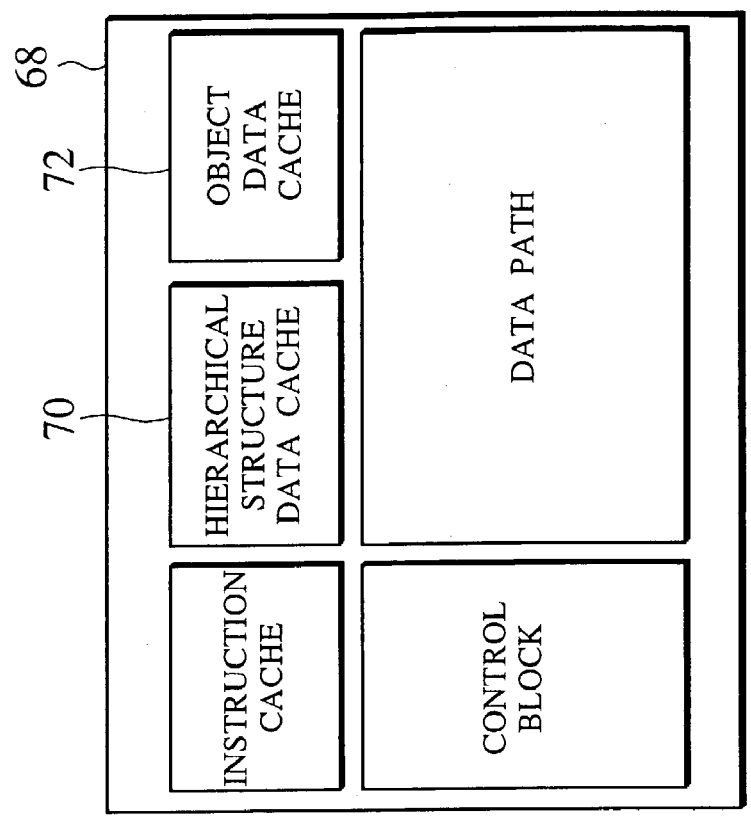
FIG. 11A is a block diagram showing a structure of a local memory, which has a data cache including two logically-divided areas, according to a third embodiment of the present invention.
Figure 11B:
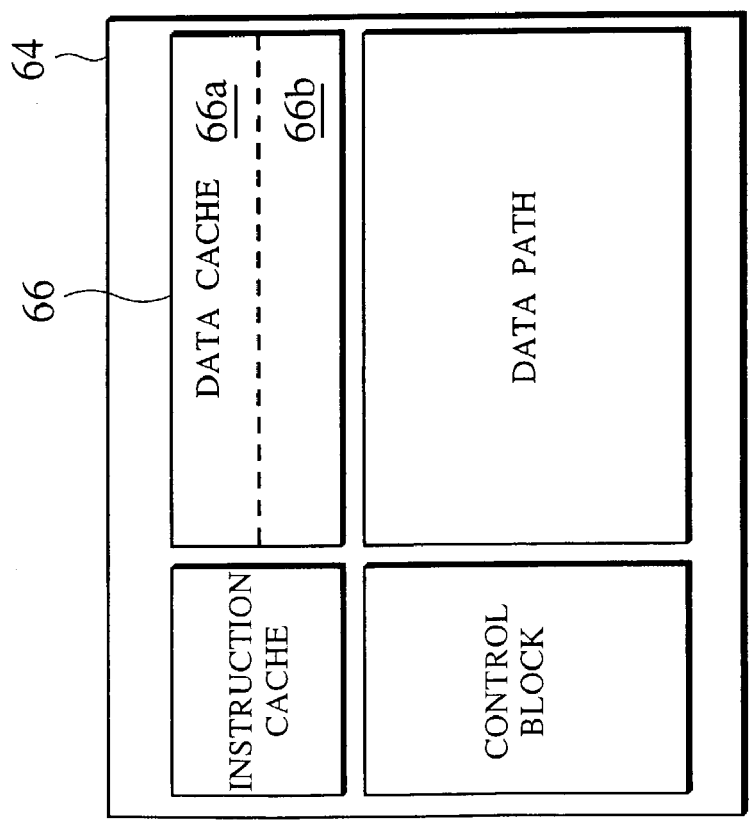
FIG. 11B is a block diagram showing a structure of a local memory, which has a data cache including two physically-divided areas, according to the third embodiment of the present invention.

FIGS. 11A and 11B are block diagrams showing a structure of the processor core according to the third embodiment of the present invention. The processor core 64 shown in FIG. 11A divides logically one data cache 66 into two areas 66*a* and 66*b*. The hierarchical structure data and the object data are stored in the areas 66*a* and 66*b* respectively. For example, the hierarchical structure data are stored in the area 66*a* and the object data are stored in the area 66*b*. In contrast, the processor core 68 shown in FIG. 11B includes a hierarchical structure data cache 70 for storing the hierarchical structure data and an object data cache 72 for storing the object data. In the processor core 68, the cache memories can be optimized according to characteristics of the data stored in the cache. For example, the object data are data which do not need the writing access but need the reading access. Accordingly, the object data cache 72 may be formed of a scratch pad, for example. The scratch pad consists of high speed memories and can read the data at a high speed. As a result, high speed reading of the object data can be achieved and thus the higher speed of the image process can be achieved.

Figure 12B:
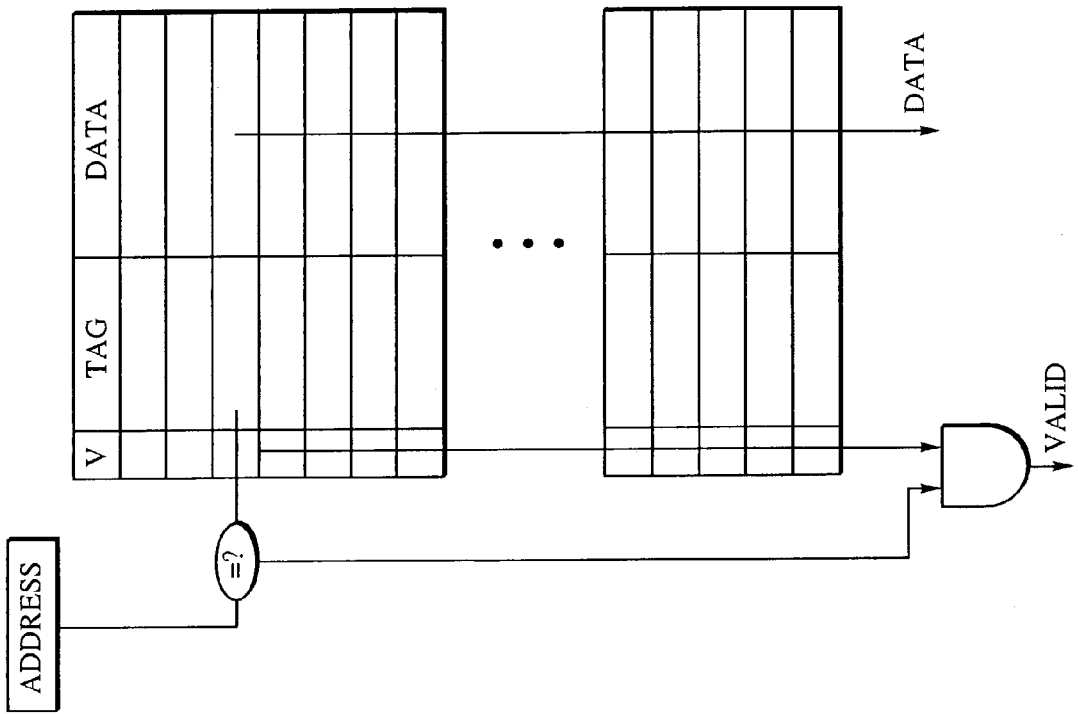
FIG. 12B is a view showing a cache structure according to a normal direct mapping method.
Figure 12A:
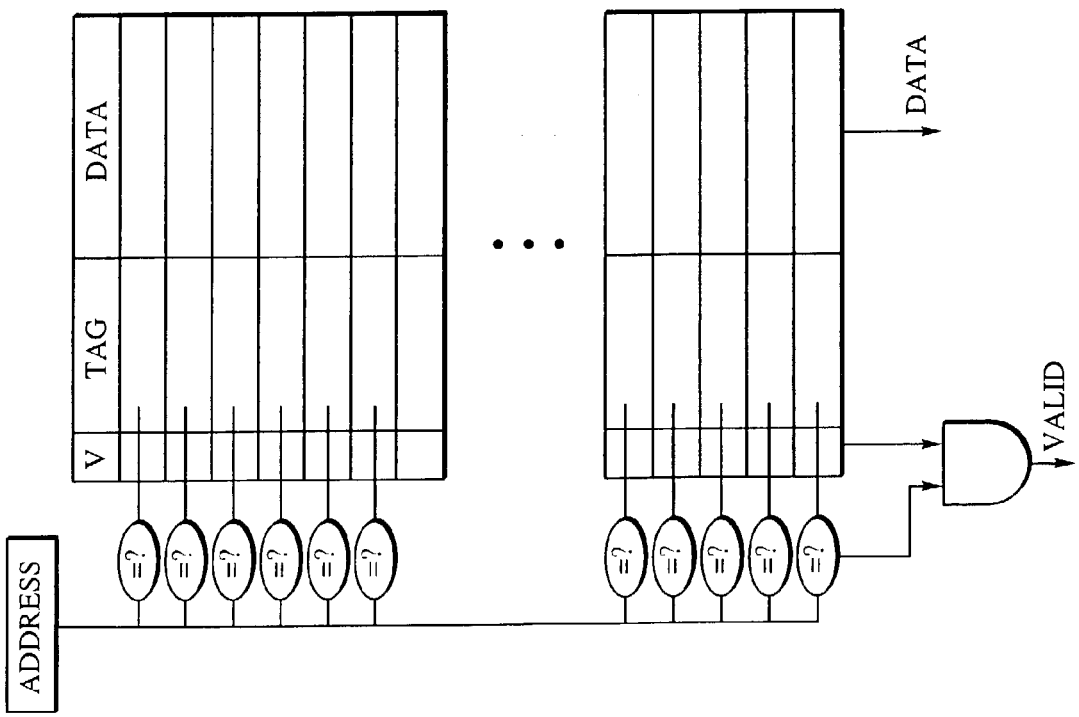
FIG. 12A is a view showing a cache structure according to a normal full associative method.

Then, the object data cache 72 in FIG. 11B will be explained in detail. At first, a structure of the normal cache will be explained in brief. As the structure of the cache, there are the full associative method and the direct mapping method. The normal cache structures are shown in FIGS. 12A and 12B. FIG. 12A shows a cache structure according to the full associative method, and FIG. 12B shows a cache structure according to the direct mapping method. In both cache structures shown in FIGS. 12A and 12B, the reading process of the data is executed while comparing a tag of the address with a tag in the cache. If the tag of the address is equal to the tag in the cache and a valid bit is set, the reading hits the cache. Then, the data of the corresponding line are read out. If not, the reading misses the cache. Then, concerned data are refilled from the main memory and then the data are read out. In any cache structure, the size of the line serving as a minimum unit of the data is fixed. Then, hit check, refill, etc. of the data are executed line by line.

An example of the object data stored in the object data cache according to the third embodiment of the present invention is shown in FIG. 13. In the fields of the image process, etc., in some cases the data are processed in a unit which is called the object and large to some extent. The object data shown in FIG. 13 are data associated with the spherical object and are an information set concerning radii, coordinates, colors, etc. of the sphere. As features of the object data shown in FIG. 13, followings may be listed.

(1) The data of one object are arranged collectively on the memory.

(2) The access for the data is carried out every one object as the unit.

(3) Unnecessary data are generated by using one object as the unit.

As shown in FIG. 13, respective addresses of the data indicating attributes of one object such as the radius, the coordinates, etc. can be expressed by the offset from the head address of the object (called the "offset" hereinafter). Therefore, it is sufficient that the above comparison of the tags is applied only to the head address of the object. However, in the cache structures shown in FIGS. 12A and 12B, even the same object data are managed individually by the memory address. Therefore, upon reading the object data, the comparison of the above tags is performed in the line unit of the cache in place of the object unit. This causes the useless tag comparison to increase a cost needed in the tag comparison.

If the reading of the object data is missed, such data are read from the main memory and then stored in a data portion of the cache. Nevertheless, exchange of the cache is not performed until the data are accessed actually. Therefore, if the object data which relate to the same object and are used successively are missed, the refilling process of the data is generated every data access. As a result, the computing process and the refilling process are alternatively generated to thus lower the performance of the system.

The object data cache according to the third embodiment of the present invention enables to execute the handling of the data not every line of the cache but every object. Accordingly, a time required for the hit check can be reduced and a cost of the hardware can be reduced. Also, the performance of the system can be improved by reading the data in advance. In addition, unnecessary object data are cleared collectively to increase an efficiency of data utilization.

Figure 14:
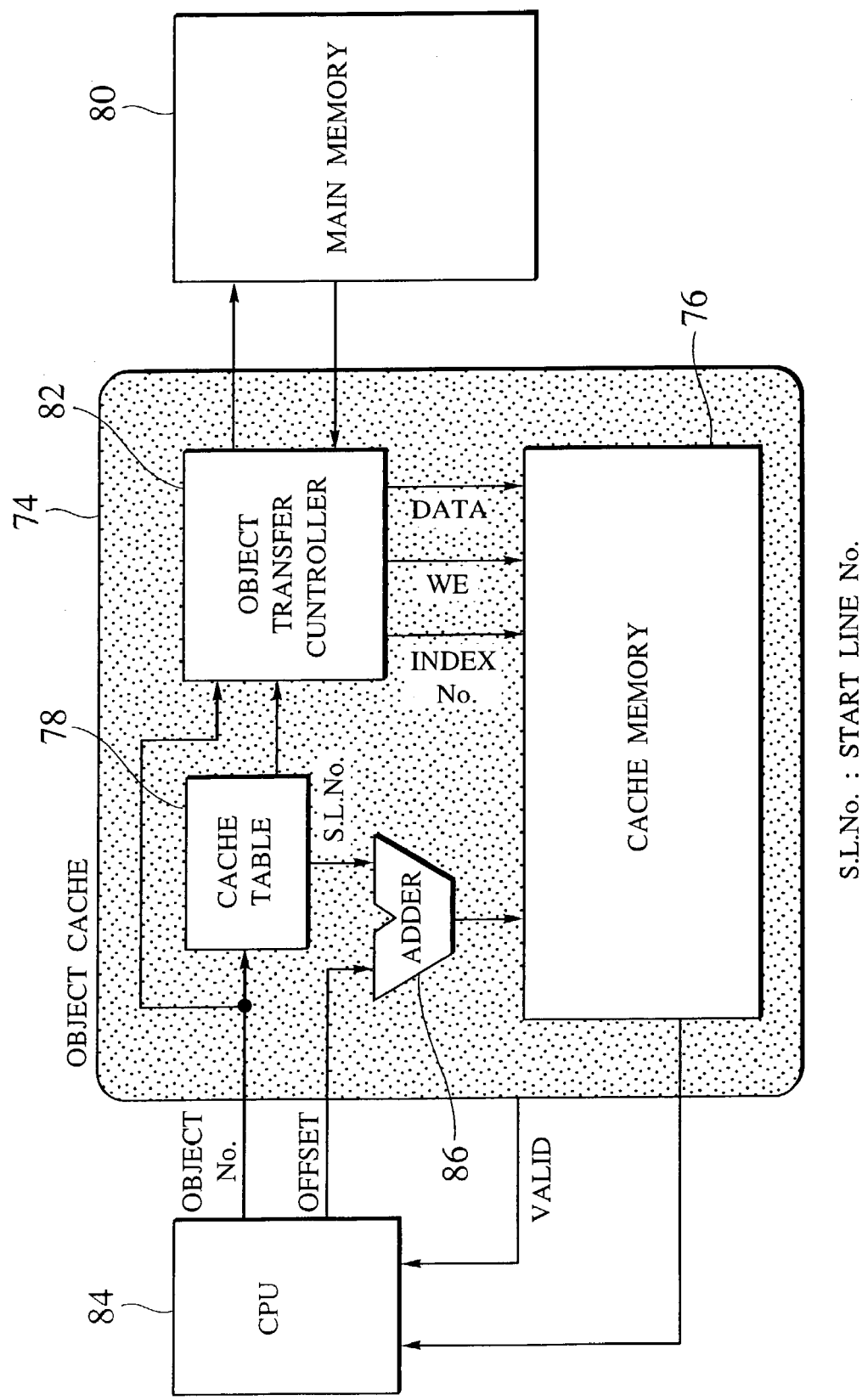
FIG. 14 is a view showing a structure of the object data cache according to the third embodiment of the present invention.

A structure of the object data cache according to the third embodiment of the present invention is shown in FIG. 14. As shown in FIG. 14, the object cache 74 according to the third embodiment of the present invention includes at least a cache memory 76 for holding the object data, a cache table 78 for indicating the object data arranged in the cache memory 76, and an object transfer controller 82 for instructing the main memory 80 to transfer the data.

As shown in FIG. 15A, the cache memory 76 is composed of a plurality of lines, each consists of a data field for storing the object data, a valid bit field for indicating whether or not the data are valid, and an entry No. field for indicating the entry No., which corresponds to the data, in the cache table 78. Also, the cache table 78 has the above cache structures shown in FIGS. 12A and 12B. As shown in FIG. 15B, the cache table 78 is composed of a plurality of entries, each consists of a start line No. field for indicating a start line No. of the lines in the cache memory 76 which stores the object data, an object No. field for indicating an identification number of the object stored in the line, a valid bit field for indicating whether or not the start line No. is valid.

Then, an operation of the object cache according to the third embodiment of the present invention will be explained with reference to FIG. 14 and FIGS. 15A and 15B hereunder. Suppose that, in FIG. 14 and FIGS. 15A and 15B, a CPU 84 instructs the object cache 74 to send the object identification number and the offset in reading the data. If the data access request is issued by the CPU 84, if the data exit in the cache memory 76 (object hit), the start line No. which corresponds to the data is output from the cache table 78. The output start line No. and the offset given by the CPU 84 are added by an adder 86 and then output to the cache memory 76. Then, the object data stored in the cache memory 76 are output to the CPU 84 and also a valid signal indicating that the data are valid is transferred to the CPU 84 at the same time.

In contrast, unless the data requested by the CPU 84 exit in the cache memory 76 (object miss), the valid signal is not output to the CPU 84. The CPU 84 transfers the object identification number to the object transfer controller 82, and then instructs the object transfer controller 82 to transfer the data to the cache memory 76. The object transfer controller 82 reads all the object data having the received object identification numbers from the main memory 80 and then refill them in the cache memory 76. If sizes of the object data are constant upon the refilling process, a predetermined amount of data are transferred from the main memory 80. On the contrary, the sizes of the object data are different, the data having different sizes are transferred. This refilling operation is carried out by the object transfer controller 82 independently from an operation of the CPU 84. The data and the valid signal are output to the CPU 84 as soon as the refilling operation of the data is sequentially finished. The refilling operation of other data can be carried out in parallel with the process of the CPU 84 using the output data.

In the object cache 74 according to the third embodiment of the present invention, the hit check is performed to respective entries of the cache table 78 in place of respective lines of the cache memory 76. Since the number of entries in the cache table 78 is smaller than the number of lines in the cache memory 76, a cost of the hit check can be reduced. Also, since the overall object data can be refilled, it is possible to preload the necessary data if the data of the same object are utilized successively. As a result, the penalty of the data refill can be made small.

Figure 16:
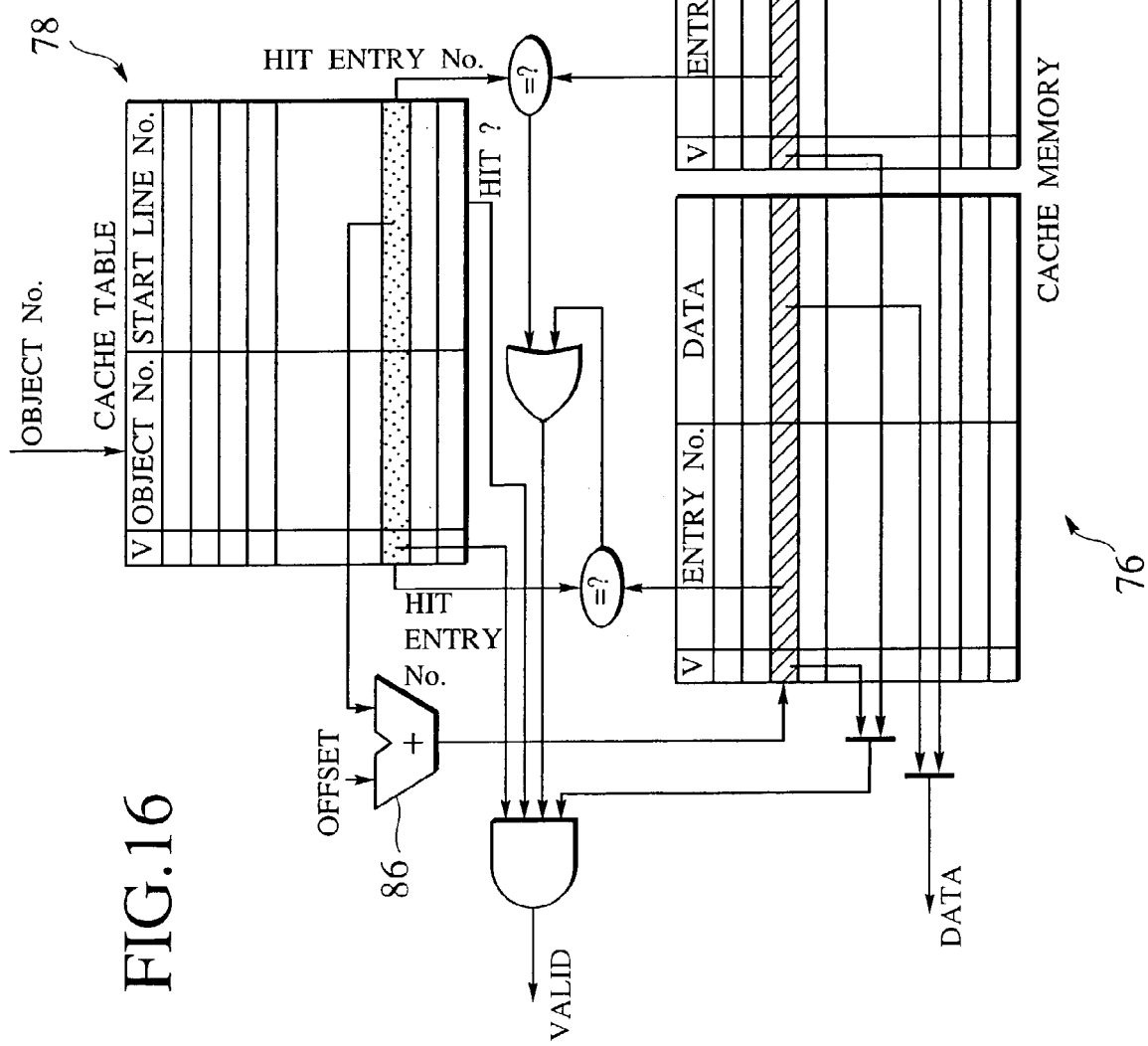
FIG. 16 is a view showing an operation of the object data cache according to the third embodiment of the present invention at the time of object hit.

Then, an operation of the object cache 74 according to the third embodiment of the present invention will be explained in more detail hereunder. As shown in FIG. 16, the cache memory 76 in FIG. 14 employs two-way set associative method wherein two line arranging locations are present, while the cache table 78 employs the full associative method wherein arranging locations of respective entries are not fixed. The case of object hit and the case of object miss are explained separately in the following disclosure, but actually these cases are processed in parallel.

In the initial state, all valid bits of the cache memory 76 and the cache table 78 are set to zero. If the data access request is issued from the CPU 84, the cache table 78 receives the object identification number from the CPU 84. The cache table 78, when receives the object identification number, outputs following items.

(1) The hit signal indicating that the input object identification number is present in the cache table 78.

(2) The start line No. of the lines in the cache memory 76 which stores the data of the object having the input object identification number.

(3) The valid signal indicating that the start line No. is valid, (4) The hit entry No. indicating which entry in the cache table 78 hits.

Where the above items (1) to (4) are valid only after the above item (1) has been set.

Since the above item (1) is set in the case of object hit, the above items (2) to (4) become effective. Then, the start line No. in the item (2) and the offset are added by the adder 86. The access for the cache memory 76 is performed in response to the address as the added result. The cache memory 76, when accessed, following signals are output from respective ways.

(5) The valid signal indicating that the accessed line is valid.

(6) The entry No. indicating to which entry in the cache table 78 the line corresponds.

(7) The object data stored in the line.

Where the above items (6) and (7) are valid only after the above item (5) has been set.

In the case of the object hit, the hit entry No. in the above item (4) coincides with the entry No. in the item (6) in either way. Then, the valid signal in the item (5) and the object data in the item (7) in the hit way are selected. The selected object data are transferred to the CPU 84. While, the valid signal being output to the CPU 84 is a logical multiplication of item (1), item (2), a logical addition of item (4) and the compared result between the items (6) in each ways, and the selected item (5).

Figure 17:
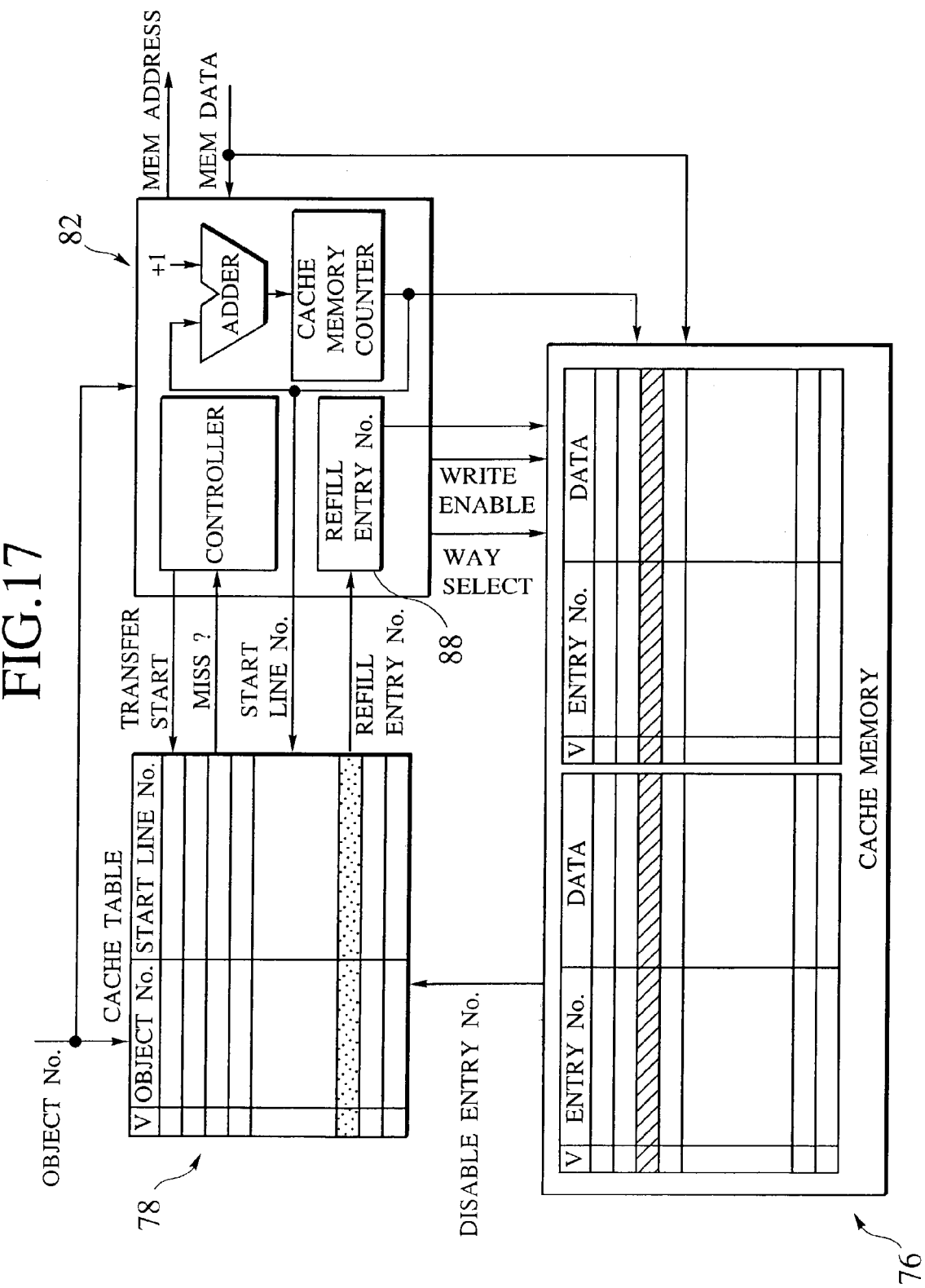
FIG. 17 is a view showing an operation of the object data cache according to the third embodiment of the present invention at the time of object miss.

Next, the case of object miss will be explained with reference to FIG. 17 hereunder. The cache table 78 which receives the object identification number outputs the miss signal indicating that the data of the request object do not exist in the cache memory 76 to the object transfer controller 82. When receives the miss signal, the object transfer controller 82 holds the information (refill entry No.) indicating into which entry of the cache table 78 the data are loaded in a built-in register 88 if such controller 82 is in its data transfer enable state. This information is held until transfer of the object data is finished.

The object transfer controller 82 acquires the object identification number and then identifies the storing locations of the object data in the main memory 80. If a start address and a data size of the object data are held in the main memory 80, the object transfer controller 82 acquires them for data transfer.

At the time of starting the data transfer, the object transfer controller 82 outputs a transfer start signal and the start line No. in the cache memory 76 to the cache table 78. Then, the cache table 78 loads the received start line No. into the start line No. field of the designated entry. Then, the valid bit of the valid bit field of the loaded entry is set. The valid bits are sequentially set at the time of starting the data transfer of the object. Therefore, the data can be transferred sequentially to the CPU 84 as soon as such data are refilled.

In addition, the object transfer controller 82 outputs a write enable signal, a way number by which the loading is conducted, and the line No. in the cache memory 76, which is subjected to the loading. The line No. which receives the loading is managed by the object transfer controller 82. More particularly, the line No. is decided by counting up by 1 every time when the loading is performed in sequence from the start line No. The object transfer controller 82 loads the entry No. in the cache table 78, which corresponds to the line, into the entry No. field of each line of the cache memory 76 and loads the object data, which are acquired from the main memory, into the data field. Selection of the way may be conducted by the LRU method, etc. According to the transferred object data, in some case a possibility of reuse is requested based on the calculation result of the CPU 84. In this case, the selection of the way can be carried out since the object transfer controller 82 can get the information concerning the result from the CPU 84.

The cache memory 76 sets the valid bit of each line at the same time of data loading. As for the line on which the valid bit has already set, the entry No. stored in the entry No. field of the line is output to the cache table 78. The cache table 78 rests the valid bit of the entry having the received entry No., and disables the entry.

Next, how the loading into the cache memory 76 and the cache table 78 according to the third embodiment of the present invention is performed will be explained with reference to FIG. 18 and FIGS. 19A to 19E hereunder. FIG. 18 shows an example of a plurality of object data stored in the main memory 80. FIGS. 19A to 19E are views showing changes in contents of the cache memory 76 and the cache table 78 when the object data in FIG. 18 are stored in the cache memory 76. For simplicity of explanation, suppose that the objects in FIG. 18 are accessed by the CPU 84 in the order of the object 1, the object 2, the object 3, . . . , the object 8. Suppose that, in FIGS. 19A to 19E, the cache memory 76 is 1 way-16 lines and the cache table 78 is 4 entries.

At first, in the initial state, all valid bits in the cache memory 76 and the cache table 78 are reset. In this case, even if the CPU 84 issues the access request to the object 1, no entry which corresponds to the object 1 exists in the cache table 78 (see FIG. 19A). Accordingly, the data of the object 1 are refilled in the order from the 0 line in the cache memory 76. At the same time, correspondence of this refill to the 0 entry of the cache table 78 is loaded. While, the fact that the loaded data belong to the object 1 and the start line No. of the line into which the data are loaded are loaded into the cache table 78 (see FIG. 19B). If the CPU 84 issues the access request to the object 2, the similar procedures are taken (see FIG. 19C).

Then, if the CPU 84 issues the access request to the object 3, information of the object 3 are loaded into the 2 entry of the cache table 78 and then the object data are loaded sequentially from the line 12 of the cache memory 76 (see FIG. 19D). When the object data are loaded into the 15 line of the cache memory 76, the loading is started again from the 0 line. At this time, the valid bits of the 0 entry of the cache table 78, which corresponds to the 0 line and the 1 line, are reset (see FIG. 19E).

Fourth Embodiment

Next, a fourth embodiment of the present invention will be explained hereunder. In the system in which a plurality of nodes and one target are connected mutually via the network, if the access requests are issued simultaneously from a plurality of nodes to a target, in some cases the performance of the overall system is lowered because of competition of the access requests. Such performance degradation may be similarly generated in the image processing system according to the first embodiment shown in FIG. 7. That is, competition of the access requests may be caused in the insides of the chips 52, the boards 56, and the computers 58 in FIG. 7. Of course, this is similarly true of the network 60 which connects a plurality of computers 58. The fourth embodiment of the present invention is concerned with an image processing system in which the simultaneous access requests are issued very frequently from a plurality of nodes to one target. That is, the access waiting time (latency) from each node to the target can be reduced small by executing the burst transfer in which a plurality of access requests for the same target are collected into one set, so that the performance degradation of the overall system can be prevented.

Figure 20:
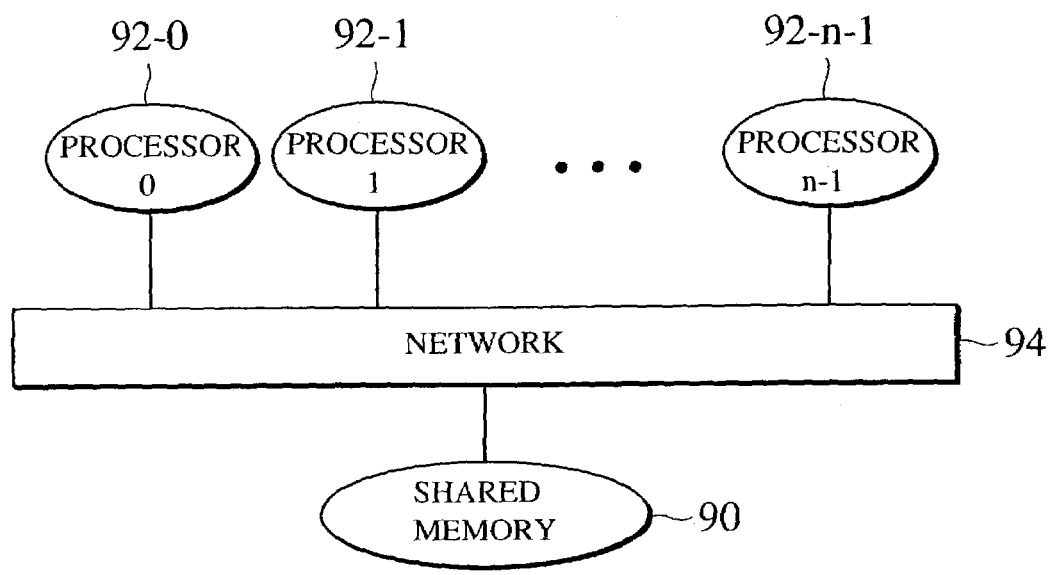
FIG. 20 is a view showing a shared memory type multi processor employed in the explanation of a fourth embodiment of the present invention.

The fourth embodiment of the present invention will be explained while using the system configuration shown in FIG. 20 hereinbelow. FIG. 20 shows a shared memory type multi processor in which a single shared memory 90 and n processors 92-0, 92-1, . . . , 92-n-1 are connected via a network 94. Of course, the scope of the present invention is not limited to the multi processor. To begin with, a combining function and an extended combining function according to the fourth embodiment of the present invention will be explained hereunder.

Combining Function

Figure 21:
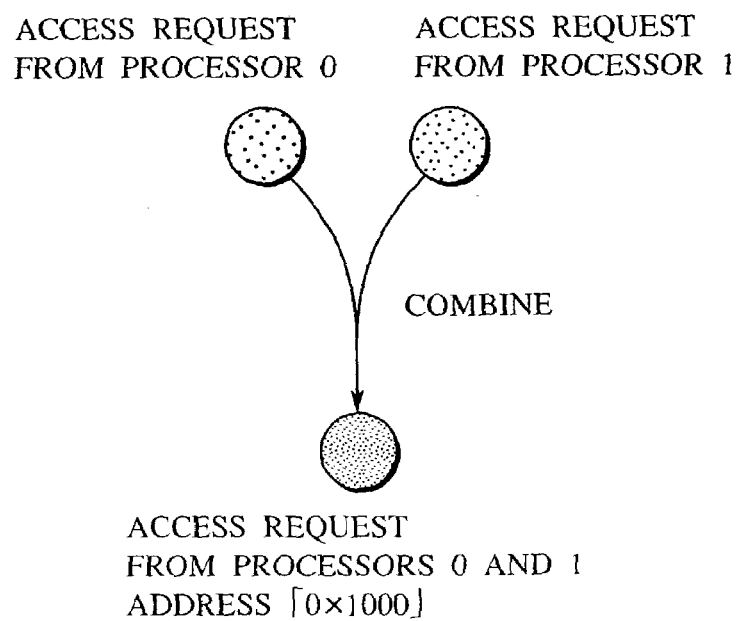
FIG. 21 is a view showing the case where both an access request from a processor 92-0 and an access request from a processor 92-1 in FIG. 20 are read accesses for a "0×1000" address of a shared memory 90.

FIG. 21 shows the case where both the access request issued from the processor 92-0 and the access request issued from the processor 92-1 in FIG. 20 are read accesses for a "0×1000" address of the shared memory 90. In this case, if two access requests are combined as a set to handle it as one access request, access competition can be avoided. This function for combining two access requests into a group and handling it as one access request is called the "combining function". The read accesses issued from the processors 92-0, 92-1 are combined into one read access by this combining function, and then the data at the "0×1000" address of the shared memory 90 are read based on such one read access. Then, the read data are sent to two processors 92-0 and 92-1 respectively. In this manner, if the access requests having the same address are issued from a plurality of processors, the combining function can avoid the competition of the access requests by combining the access requests into one access request and thus can reduce the access waiting time of the processors.

Extended Combining Function

Figure 22A:
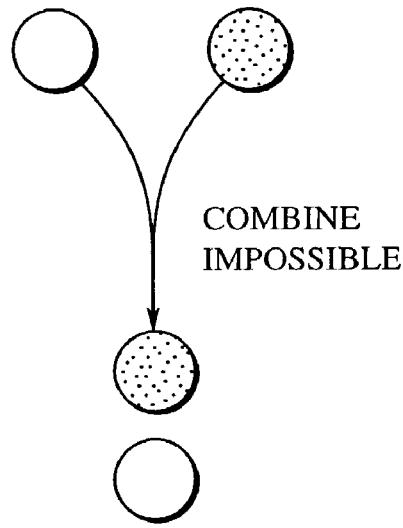
FIG. 22A is a view showing the case where the one-word (4-byte) access request from the processor 92-0 in FIG. 20 is the read access for the "0×1000" address of the shared memory 90, the one-word access request from the processor 92-1 is the read access for the "0×1004" address, and these two access requests cannot be combined together.
Figure 22B:
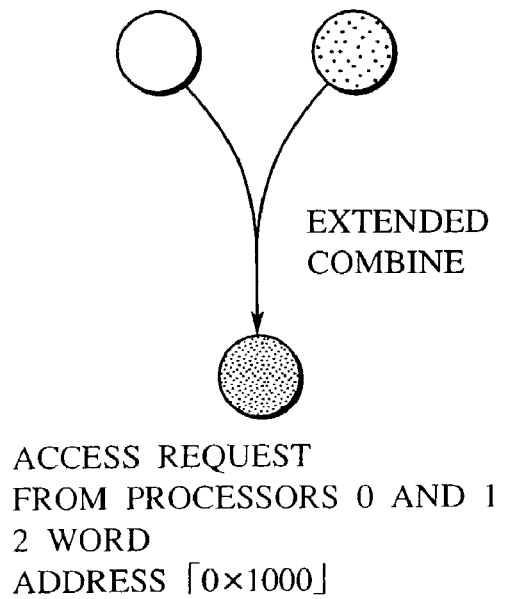
FIG. 22B is a view showing the case where the one-word (4-byte) access request from the processor 92-0 in FIG. 20 is the read access for the "0×1000" address of the shared memory 90, the one-word access request from the processor 92-1 is the read access for the "0×1004" address, and these two access requests can be extended-combined together.

FIG. 22A shows the case where the one-word (4-byte) access request from the processor 92-0 in FIG. 20 is the read access for the "0×1000" address of the shared memory 90, the one-word access request from the processor 92-1 is the read access for the "0×1004" address. In this case, since two destination addresses are not identical, these two access requests cannot be combined together by the above combining function. As shown in FIG. 22B, unlike the combining function, the extended combining function can combine a plurality of access requests for different addresses into one access. This extended combining function is very effective in the system in which a plurality of access requests from the nodes are issued often to mutually neighboring addresses. Of course, the extended combining function may be employed in the case where a plurality of access requests are issued to the same address.

Then, a queue system according to the fourth embodiment of the present invention will be explained hereunder. The queue system according to the fourth embodiment of the present invention includes the above extended combining function therein. A configuration of the queue system according to the fourth embodiment of the present invention is shown in FIG. 23. This queue system is applied to the multi processor shown in FIG. 20. As shown in FIG. 23, the queue system according to the fourth embodiment of the present invention includes at least an arbitrating portion 96, a comparing portion 98, a queue portion 100, and a multicast portion 102. Respective sections will be explained hereunder.

Arbitrating Portion

Figure 24:
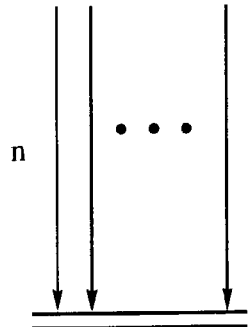
FIG. 24 is a view showing a configuration of an arbitrating portion in FIG. 23.

A high operation frequency is requested in the LSI. Therefore, if all n processors 92-0, . . . , 92-n-1 issue the access requests simultaneously to a shared memory 90, practically it is difficult to compare all these access requests within one clock cycle and then execute the above extended combining function. The arbitrating portion 96 in FIG. 23 decides the access requests, which are to be sent to the comparing portion 98, out of a plurality of access requests every one clock cycle. A configuration of an arbitrating portion is shown in FIG. 24. As shown in FIG. 24, the arbitrating portion 96 has at least a multiplexer 104 and an access table 106. The multiplexer 104 selects several access requests from the access requests issued from a plurality of processors 92-0, . . . , 92-n-1 and then sends them to the comparing portion 98. The multiplexer 104 can select k access requests at maximum from n access requests at maximum. The access table 106 has a plurality of bits indicating the processors whose access requests are stored in the queue portion 100. Respective bits correspond to the processors 92-0 and 92-n-1 respectively. Each bit is set to "1" when the access request is stored in the queue portion 100, and is held at "1" until the access request is executed.

The multiplexer 104 selects the access request, which are to be sent to the comparing portion 98, by looking up the access table 106.

In this case, when the queue portion 100 is in a blocking state, the arbitrating portion 96 selects no new access request issued from the processor whose access request has already been stored in the queue portion 100. In contrast, when the queue portion 100 is in a nonblocking state, it may be indicated at what cycle before the access table 106 has accepted the access requests from the processors in the past or how many access request the access table 106 has accepted from the processors in the past. If the access requests are selected by looking up the access table 106, the access requests issued from the processors can be arbitrated more fairly. In this case, the access table 106 allocates a plurality of bits to the processors and indicates access request states from the processors.

Comparing Portion

Figure 25:
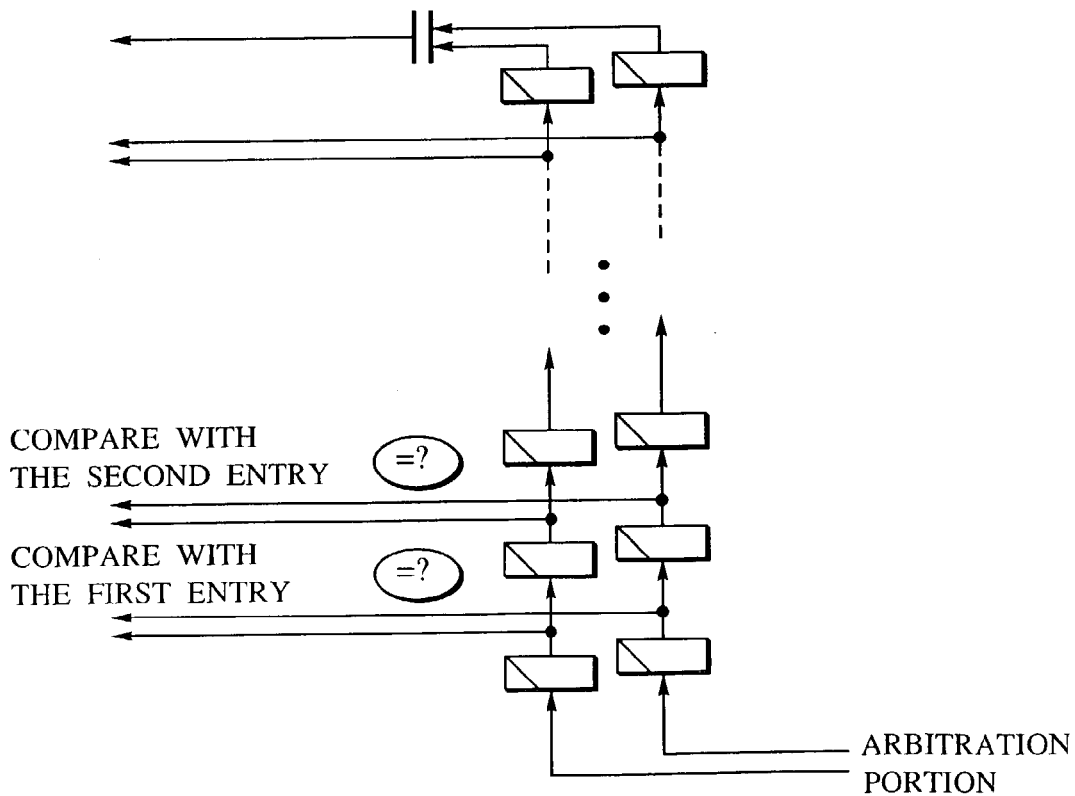
FIG. 25 is a view showing a configuration of a comparing portion in FIG. 23.

The comparing portion 98 compares the access request selected by the arbitrating portion 96 with the access request stored in respective entries of the queue portion 100. A configuration of the comparing portion 98 is shown in FIG. 25. The comparing portion 98 first compares the access request selected by the arbitrating portion 96 with the access request stored in the head entry of the queue portion 100. If two access requests are combined together by the extended combining function, the comparing portion 98 sends the access request selected by the arbitrating portion 96 to the head entry of the queue portion 100 as it is. Then, the sent access request is combined with the access request stored in the head entry by the extended combining function. In contrast, unless two access requests are combined together by the extended combining function, the comparing portion 98 compares the access request selected by the arbitrating portion 96 with the access request stored in the second entry of the queue portion 100. If two access requests are combined together by the extended combining function, the comparing portion 98 sends the access request to the queue portion 100. While, unless two access requests are combined together, the comparing portion 98 compares the access request selected by the arbitrating portion 96 with the access request stored in the third entry of the queue portion 100. The comparison is performed in the same manner in the following. Unless the access request selected by the arbitrating portion 96 is combined with the access request stored in all entries by the extended combining function, such access request is stored in the last entry of the queue portion 100. These comparing processes are executed as the pipeline process to improve the processing speed.

The arbitrating portion 96 selects several requests out of the access requests from a plurality of processors, and then outputs them to the comparing portion 98. Therefore, there is such a possibility that chances of the extended combining function are lowered. The fourth embodiment of the present invention intends to increase the number of access requests which can be accepted at a time by multiplying the operation frequencies of the arbitrating portion 96 and the comparing portion 98 rather than other frequencies. This is based on the fact that respective portions can be operated mutually independently.

Queue Portion

Figures 26, 27:
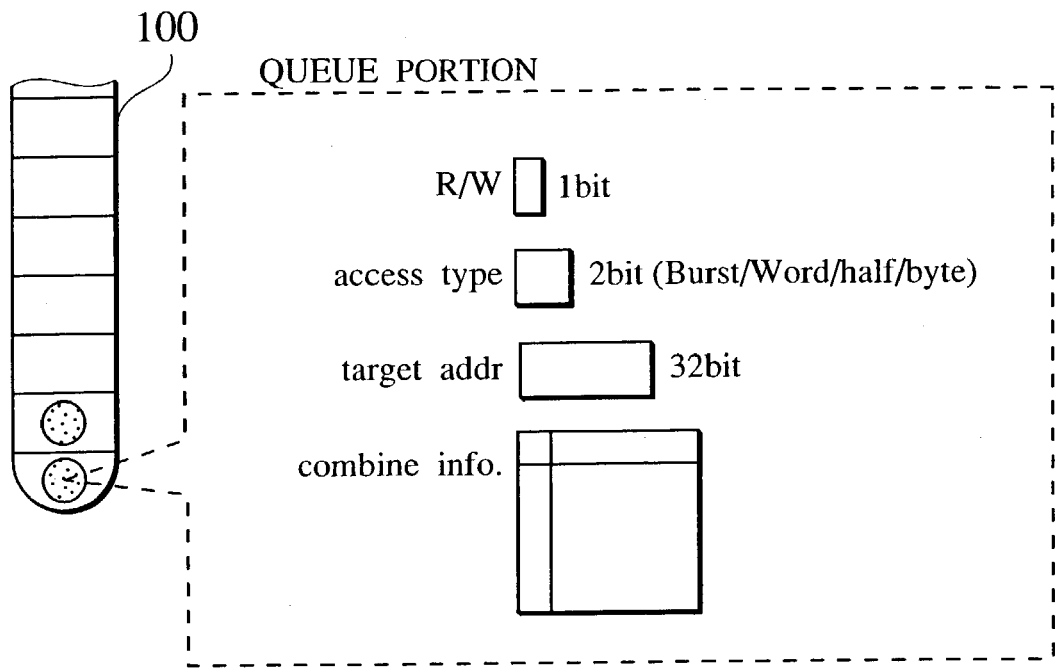
FIG. 26 is a view showing a configuration of a queue portion in FIG. 23.
FIG. 27 is a view showing a combine information table in FIG. 26, wherein 4 word-Burst-read from the processor 0 to an address "0×1001", 2 word-Burst-read from the processor 1 to an address "0×1008", and 2 word-Burst-read from the processor 2 and the processor 3 to an address "0×1000" are extended-combined together.
Figures 28, 29:
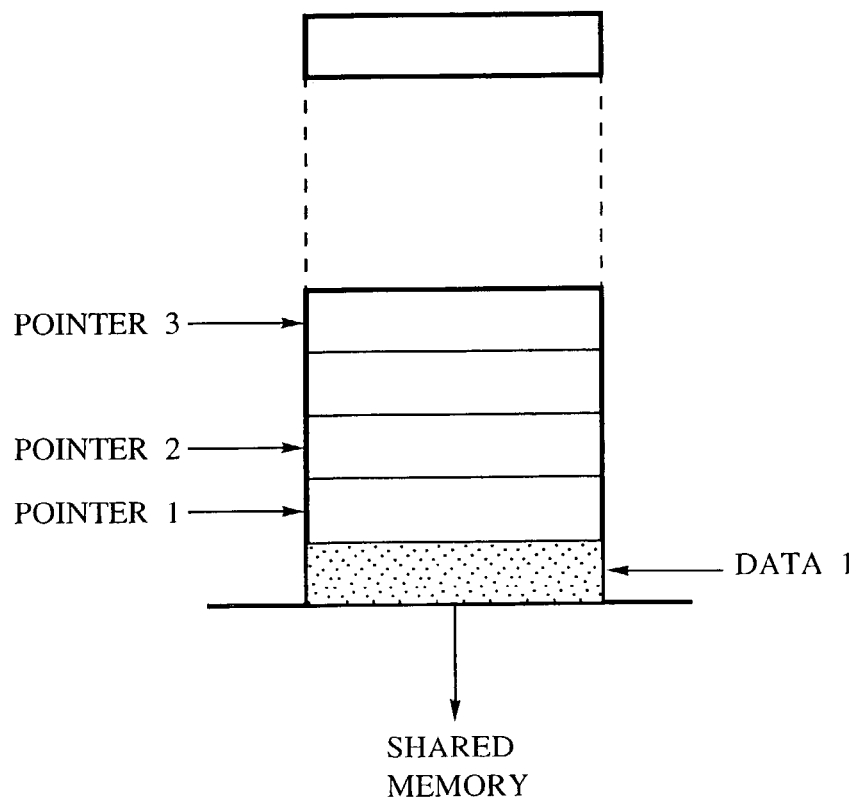
FIG. 28 is a view showing the combine information table in FIG. 26, wherein Byte-read from the processor 2 and the processor 5 to an address "0×1000", and Byte-read from the processor 4 to an address "0×1002" are extended-combined together.
FIG. 29 is a view showing a configuration of a buffer memory provided in the queue portion in FIG. 23.

The queue portion 100 has a plurality of entries and stores the access requests issued from the processors in respective entries. The access requests stored in respective entries are picked up from the queue portion 100 in the order that they are previously stored. A configuration of the entries of the queue portion 100 is shown in FIG. 26. Each entry consists of a bit indicating that the access request corresponds to either the read operation or the write operation, two bits indicating the access type of the access request (for example, four modes of a Burst mode, a word mode, a half mode, and a byte mode), and bits indicating the target address and having a bit width corresponding to the address width. Each entry has a combine information table for storing the result of the extended combine. There are various method of implementing this combine information table. For example, if a system is composed of eight processors and the system has a maximum burst number of 8, a table of the burst access of the system is constructed as a table shown in FIG. 27. This table shows the case where 4 word-Burst-read from the processor 0 to an address "0×1010", 2 word-Burst-read from the processor 1 to an address "0×1008", and 2 word-Burst-read from the processor 2 and the processor 3 to an address "0×1000" are combined together by the extended combining function. A table of word/half/byte access is constructed as a table shown in FIG. 28. This table shows the case where Byte-read from the processor 2 and the processor 5 to an address "0×1000", and Byte-read from the processor 4 to an address "0×1002" are combined together by the extended combining function.

The queue portion 100 has a buffer memory for storing the data at the time of loading operation. This buffer memory employs a stacked structure to use firstly the latest data which is added to the stacked structure. Therefore, there is no need to assure memory areas to correspond to respective entries of the queue portion 100. Therefore, the buffer memory is desired in the respect of reducing the memory cost. Also, the buffer memory has built-in stack pointers. The stack pointers 1, 2, 3 are such registers indicating from which part of the buffer memory the data should be picked up. More particularly, they indicate to which entry the data of the loading request should be issued. In the buffer memory in FIG. 29, the lowermost data 1 is data which are now in access or data which are to be accessed in the nearest future.

Fifth Embodiment

Next, a fifth embodiment of the present invention will be explained hereunder. The ray tracing performs the intersection decision of the object pixel by pixel and then calculates the saturation and the lightness of the intersecting object. Therefore, if a total amount of the object data as the object in the intersection decision is large in contrast to a capacity of the local memory which is dependent on the processor, exchange of the object data in the local memory is frequently generated. The fifth embodiment of the present invention intends to suppress the transfer of the object data from the main memory to the local memory to the lowest minimum by executing the intersection decision of the pixels object by object and achieve the higher speed of the image processing. Here 4×4 (=16) pixels in the overall screen are allocated to the processor. Each processor has a status table for saving the states in the middle of the process of the allocated pixels. This status table has entries corresponding to the number of pixels. The status table of the processor to process 16 pixels has 16 entries. Each entry includes three fields which store an object identification number, intersection point coordinates, and a distance from the viewpoint to the intersection point respectively. The start address on the main memory for storing the object data may be used in place of the object identification number. In the following, respective field are called an object field, an intersection point coordinate field, and a distance field.

Figure 30:
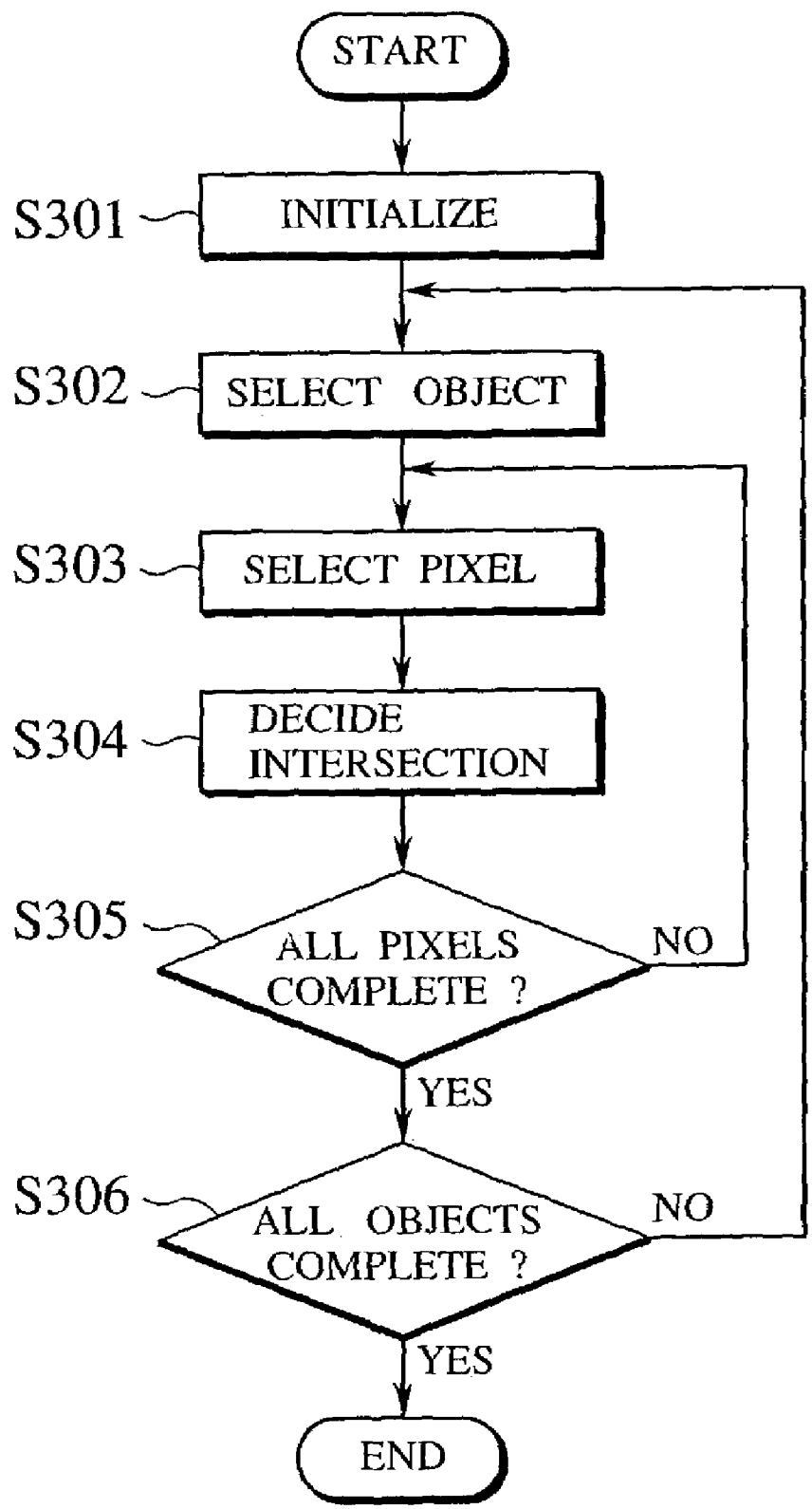
FIG. 30 is a flowchart showing process procedures in an image processing method according to a fifth embodiment of the present invention.

An operation of the fifth embodiment of the present invention will be discussed with reference to FIG. 30 in the following. To begin with, the status table is initialized. That is, the object field and the intersection point coordinate field in each entry of the status table are initialized, and also the distance field is set to an infinity (step S301). Any object is selected and the object data is loaded from the main memory to the local memory (step S302). Then, one pixel is selected (step S303). Then, the intersection decision between the ray which passes the pixel and the object selected in above step S302 is executed. Then, if they intersect with each other, the distance from the viewpoint to the intersection point is calculated. Then, if the calculated result is smaller than the value in the distance field, the object field, the intersection point coordinate field, and the distance field are rewritten (step S304). If above step S304 about all pixels is executed (step S305 YES) and above steps S303 and S304 all objects are executed (step S306 YES), this operation is ended.

After this operation has been finished, results of the intersection decision are shown in the entries corresponding to the pixels. That is, the distance fields which intersect none of the objects still remain in the infinite state. In contrast, the distance fields of the pixels which intersect any object store the object identification numbers being intersected, the intersection point coordinate fields store the intersection point coordinates, and the distance fields store the distances from the viewpoint to the intersection points.

According to the fifth embodiment of the present invention, the transfer of the object data from the main memory to the local memory is limited to the number of the objects. Accordingly, the number of times of the transfer can be reduced and as a result the higher speed of the image processing can be attained. In this case, unnecessary pixels of the objects in the intersection decision can be specified previously by perspectively transforming the object data onto the screen. In this case, the number of times of the intersection decision can be reduced and thus the higher speed of the image processing can be accelerated.

Figure 31:
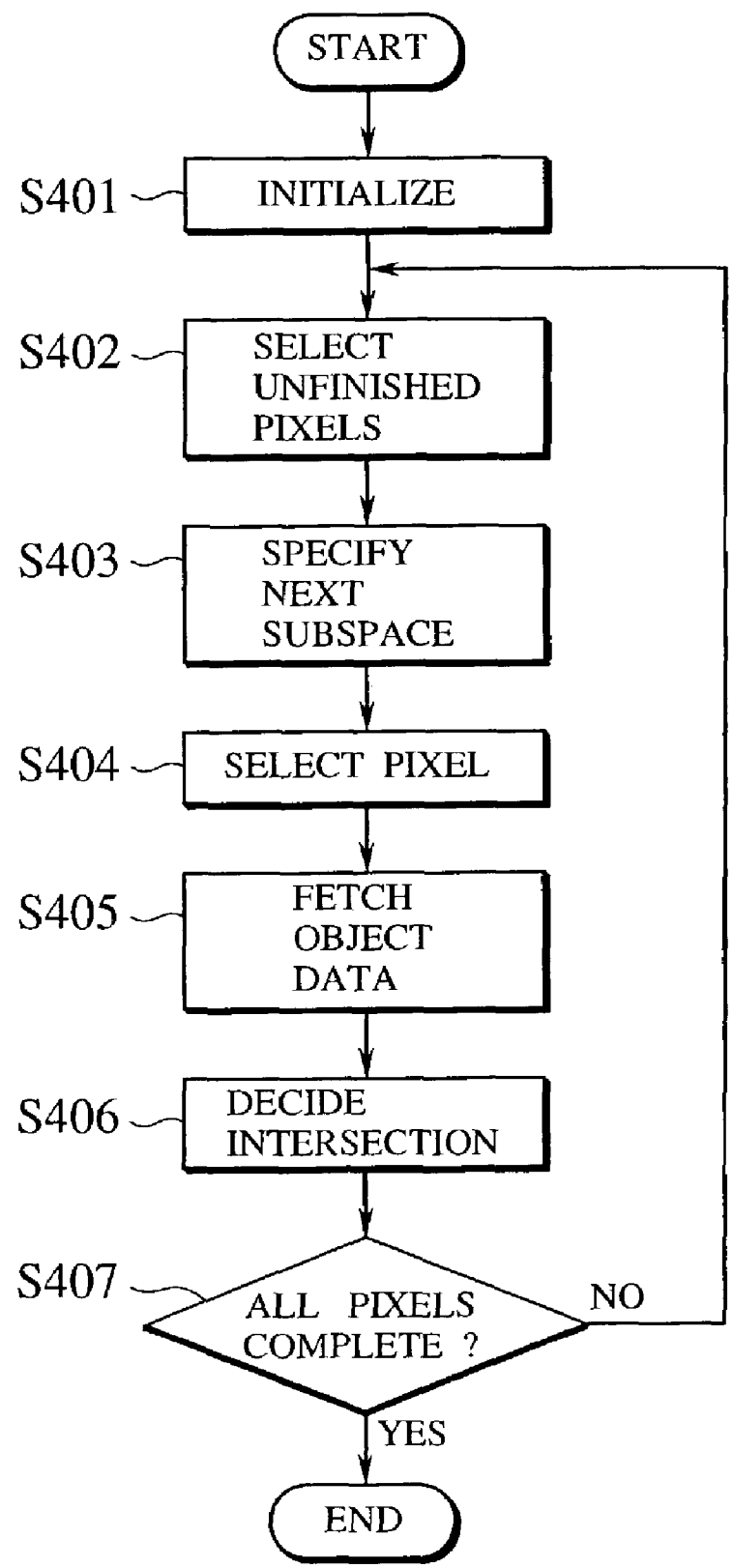
FIG. 31 is a flowchart showing process procedures in the image processing method according to the fifth embodiment of the present invention, wherein a three-dimensional space as a processed object is space-divided by octrees.

Next, the fifth embodiment of the present invention will be explained with reference to FIG. 31 hereunder in the situation that the three-dimensional space as the processed object is space-divided by the octree. In this case, in addition to the object field, the intersection point coordinate field, and the distance field, each entry of the status table in the processor further includes a finish field indicating whether or not the process of the corresponding pixels is finished, and a subspace field indicating the subspace to be processed subsequently. An operation of this case will be given as follows.

At first, the status table is initialized. That is, the object field, the intersection point coordinate field, and the subspace field in each entry of the status table are initialized, and the finish field is set to its unfinished state, and also the distance field is set to an infinity (step S401). All pixels whose finish fields are in the unfinished state are selected (step S402). The subspaces corresponding to the selected pixels, through which the ray is passed subsequently, are specified. The numbers of the specified subspaces are loaded into the subspace fields of the entries corresponding to the pixels. In this case, as for the pixels which do not have the subspaces through which the ray is passed, the process ends are loaded into the finish fields (step S403).

Then, one pixel whose finish field is set to its unfinished state is selected (step S404). Then, the object data which exist in the subspace indicated by the subspace field are loaded from the main memory to the local memory (step S405). Then, the intersection decision between the selected pixels and the read object is carried out. Then, if there are other pixels which have the same subspace in the subspace field, the intersection decision of such pixels are similarly carried out. If they intersect with each other, the distance from the viewpoint to the intersection point is calculated. Then, if the calculated distance is smaller than the value in the distance field, the object field, the intersection point coordinate field, and the distance field are rewritten. Then, the process finish of the pixel is loaded into the finish field. If the object data read in step S405 are present in plural, the intersection decisions of all objects are similarly conducted (step S406). If the processes about all pixels are finished (step S407 YES), this operation is ended.

After this operation has been finished, results of the intersection decision are shown in the entries of the pixels. That is, the distance fields which intersect none of the objects still remain in the infinite state. In contrast, the distance fields of the pixels which intersect any object store the object identification numbers being intersected, the intersection point coordinate fields store the intersection point coordinates, and the distance fields store the distances from the viewpoint to the intersection points.

Figure 32:
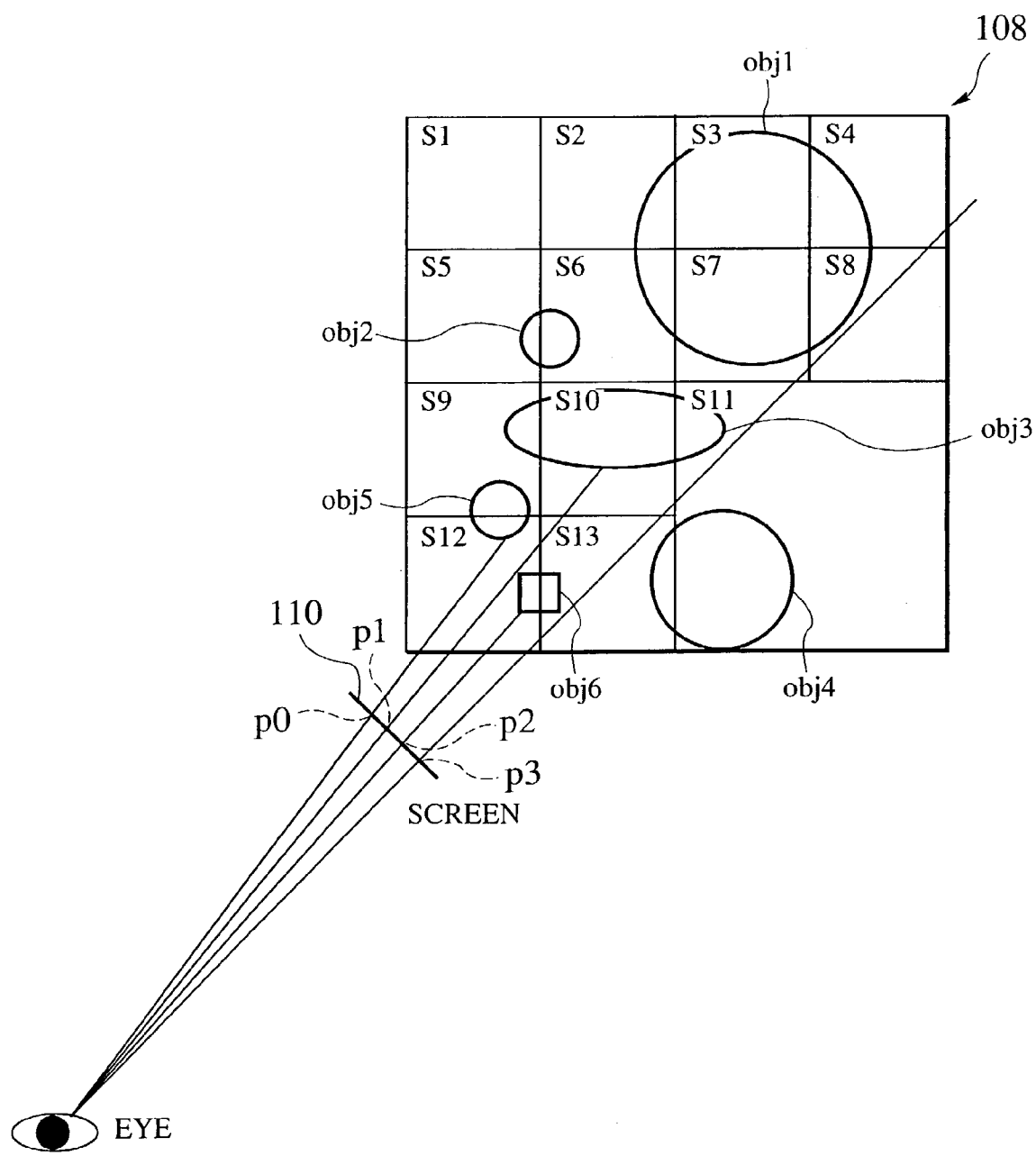
FIG. 32 is a view showing the case where intersection decision between the ray and an object in the two-dimensional space, as an example employed in explaining the fifth embodiment of the present invention.

Next, how to execute the loading into the above status table will be explained with reference to FIG. 32 and FIGS. 33A to 33G hereunder. Here the case where intersection decision between the ray and the object in the two-dimensional space shown in FIG. 32 will be explained. FIGS. 33A to 33G are views showing change in the content of the status table upon executing the intersection decision in FIG. 32. For simplicity of explanation, the two-dimensional space will be explained as the processed object space in FIG. 32. But there is caused no difference even if the three-dimensional space is selected as the processed object space. As shown in FIG. 32, six objects obj1, obj2, obj3, obj4, obj5, obj6 are present in this two-dimensional space 108. Then, the two-dimensional space 108 is divided into subspaces S1, S2, S3, S4, S5, S6, S7, S8, S9, S10, S11, S12, S13. Four pixels p0, p1, p2, p3 exit on the screen 110.

Respective entries of the status table are initialized. More particularly, the finish field is set to the unfinished state (No), and the distance field is set to an infinity ($\infty$). Other fields (the subspace field, the object field, and the intersection point coordinate field) are reset (see FIG. 33A).

First, the processes of all pixels p0 to p3 are not finished. Therefore, all pixels are selected and then the subspace, through which the ray passing through the pixels is passed subsequently, is specified. The specified subspace is loaded into the subspace field which corresponds to the pixels. In FIG. 32, all the rays passing through the pixels are passed through the subspace S12 at first. Accordingly, "S12" is loaded in respective subspace fields (see FIG. 33B).

The data of the objects obj5, obj6 in the subspace S12 are loaded from the main memory to the local memory. The intersection decision between the ray of the pixels and the objects obj5, obj6 is performed. In FIG. 32, the ray of the pixel p0 intersects with the object obj5 and the ray of the pixel p2 intersects with the object obj6. Hence, the object obj5 is loaded in the object field of the pixel p0, intersecting point coordinates (x1, y1) are loaded in the intersecting point coordinate field, and a distance d1 is loaded in the distance field. Similarly, the object obj6 is loaded in the object field of the pixel p2, intersecting point coordinates (x2, y2) are loaded in the intersecting point coordinate field, and a distance d2 is loaded in the distance field. The finish of the process is loaded in both finish fields of the pixels p0 and p2. More particularly, "Yes" signifying the finish of the process is loaded in the finish field (see FIG. 33C).

The pixels p1 and p3 in their unfinished state are selected. Then, the subspace through which the rays of the pixels are passed in turn is specified. In FIG. 32, the ray of the pixels p1 and p3 is passed through the subspace S13 following to the subspace S12. Then, "S13" is loaded in the subspace fields of the pixels p1 and p3 (see FIG. 33D).

The data of the object obj6 in the subspace S13 are loaded from the main memory to the local memory. The intersection decision between the rays of the pixels p1 and p3 and the object obj6 is performed. In FIG. 32, both the rays of the pixels p1 and p3 do not intersect with the object obj6. Hence, the object fields, the intersecting point coordinate fields, and the distance fields of the pixels p1 and p3 are not changed (see FIG. 33D).

The pixels p1 and p3 in their unfinished state are again selected. Then, the subspace through which the rays of the pixels are passed subsequently is specified. In FIG. 32, the rays of the pixels p1 and p3 are passed through the subspace S10 following to the subspace S13. Then, "S10" is loaded in the subspace fields of the pixels p1 and p3 (see FIG. 33E).

The data of the object obj3 in the subspace S10 are loaded from the main memory to the local memory. Then, the intersection decision between the rays of the pixels p1 and p3 and the object obj3 is performed. In FIG. 32, the ray of the pixel p1 intersects with the object obj3. Therefore, the object obj3 is loaded in the object field of the pixel p1, intersecting point coordinates (x3, y3) are loaded in the intersecting point coordinate field, and a distance d3 is loaded in the distance field. Then, "Yes" is loaded in the finish field. In contrast, the ray of the pixel p3 does not intersect with the object obj3. Hence, the object field, the intersecting point coordinate field, and the distance field of the pixel p3 are not changed (see FIG. 33F).

Similar processes will be carried out subsequently. In FIG. 32, the ray of the pixel p3 does not intersect with none of the subspaces. Therefore, "Yes" is loaded in the finish field of the pixel p3. The distance field remains in the infinite (∞) state as it is.

As described above, according to the fifth embodiment of the present invention, an amount of data transfer from the main memory to the local memory can be significantly reduced. Therefore, the image processing can be accelerated. For example, suppose that a capacity of the local memory which is dependent on the processor is s, all object data in the three-dimensional space are r times the capacity s of the local memory, the number of pixels is n, an amount of data to be transferred can be given by s·r·n. This is because, in the prior art, the intersection decision is carried out by loading all object data pixel by pixel in sequence to detect the intensity sequentially. On the contrary, in the fifth embodiment of the present invention, all object data are transferred from the main memory to the local memory only once. Therefore, an amount of data to be transferred can be given merely by s·r.

In addition, if the data of the object contained in the subspace are increased larger than the capacity of the local memory, which is dependent on the processor, by the space dividing operation, similarly an amount of data to be transferred can be considerably reduced by the above method. Also, in the system which can predict the object data previously, the transfer of the subsequent object data may be finished until the processes of a plurality of pixels are ended. Therefore, according to the fifth embodiment of the present invention, the overhead of the transfer is difficult to occur rather than the prior art. In the image processing system in which the image processing is carried out in parallel by using a plurality of processors, the overhead of the data transfer becomes large because of the competition of the access requests. Therefore, the fifth embodiment of the present invention is very effective in such system.

Sixth Embodiment

Next, a sixth embodiment of the present invention will be explained hereunder. In the event that one frame of the animation (moving picture) is divided into areas having the equal pixel number and the image processing is carried out by causing a plurality of processors to bear respective areas, considerable differences are caused in the processing time of the processors because of difference in the number and the form of the objects in the areas allocated to the processors.

A time required for the drawing of overall one frame depends on the longest time in the drawing processes of the processors. Therefore, if the processing time of one processor is extremely long rather than other processing times, the image processing is delayed as a whole. Also, the processor which has finished the process previously bears no process until the processes of other remaining processors are ended. This causes reduction in the utilization factor of the processors.

The sixth embodiment of the present invention can reduce the time required for one frame drawing by setting the processing times of the processors as equally as possible and thus can improve the utilization factor of the processors. More specifically, in the sixth embodiment of the present invention, sizes of the areas allocated to the processors during the image processing for the subsequent one frame can be adjusted based on the information representing the processing time of the processor, an amount of calculation, and the like upon the image processing in the preceding one frame. Then, the processing times of the processors can be set as equally as possible by adjusting the sizes of the areas. The sixth embodiment of the present invention is made based on the similarity between the continuous frames.

As the "information representing a processing time, an amount of calculation of the processor, and the like (referred to as "calculation amount information" hereinafter)", for example, a consumed processing time of the processor, the number of execution cycle, a miss ratio in the local memory, etc. may be considered. It may be anticipated that the processor which has a larger value of calculation information than other processors in the drawing of the preceding one frame has a larger value of calculation information in the drawing of the succeeding frame because of the similarity between the continuous frames. Then, such large value means that the processing time of the processor is longer than those of other processors. Therefore, if small allotted areas in the drawing process should be assigned to the processors which have such large value in the drawing process of one frame, the processing time can be reduced in the succeeding one frame. Here, the case where the number of execution cycle of the processor is employed as the calculation amount information will be explained. Of course, no difference is caused if the consumed processing time of the processor, the miss ratio in the local memory, or the like is utilized. Each processor is in charge of at least the process of one pixel block (set of pixels). Each pixel block consists of 2×2 (=4) pixels.

In the drawing process of one frame, the number of pixel blocks which the processor takes charge of is decided based on preceding drawing information. The "preceding drawing information" means a set of values representing the calculation amount information of each processor in the drawing process of preceding one frame. For example, the preceding drawing information are given as a set of four integers for four processors. In case the number of execution cycle is employed as the calculation amount information, such number of execution cycle is displayed by bit-degenerated value of the actual number of execution cycle. This is because an amount of data transmission must be reduced. More particularly, if the number of execution cycle is represented by the fixed point number of 64-bit binary digits, a most significant bit position of "1" is assumed as the calculation amount information. A decimal point position is fixed on the right of the least significant bit (LSB).

For example, if the number of execution cycle is ten hundreds million, the fixed point number of 64-bit binary digits can be given by 0000 0000 0000 0000 0000 0000 0000 0000 0011 1011 1001 1010 1100 1010 0000 0000

The most significant bit of "1" is the thirtieth bit from the LSB. Accordingly, in this case, the bit-degenerated value, i.e., the calculation amount information can be given by 30. In this case, if the actual number of execution cycle is represented by 64 bits, the maximum value of the bit-degenerated value becomes 64. Six-bit patterns are $2^6=64$. Therefore, numerical values from 0 to $2^6-1$ can be enoughly represented by these bit patterns.

Also, since the processor performs the process of a plurality of pixel blocks, the calculation amount information of the processor can be given as accumulation of the calculation amount information needed in the processes of respective pixel blocks. The calculation amount information are the bit-degenerated value of the number of execution cycle. Therefore, the accumulation of the calculation amount information can be achieved by adding "1" to the calculation amount information of one pixel at the bit which is indicated by the calculation amount information of the succeeding pixel.

For example, in case the calculation amount information of one pixel is 30, the fixed point number of 64-bit binary digits can be given as 0000 0000 0000 0000 0000 0000 0000 0000 0010 0000 0000 0000 0000 0000 0000 0000

In case the calculation amount information of the succeeding pixel is 29, "1" is added to the twenty-ninth bit from LSB.

0000 0000 0000 0000 0000 0000 0000 0000 0011 0000 0000 0000 0000 0000 0000 0000

In case the calculation amount information of the succeeding pixel is 29, "1" is added to the twenty-ninth bit from LSB.

0000 0000 0000 0000 0000 0000 0000 0000 0100 0000 0000 0000 0000 0000 0000 0000

Figure 34:
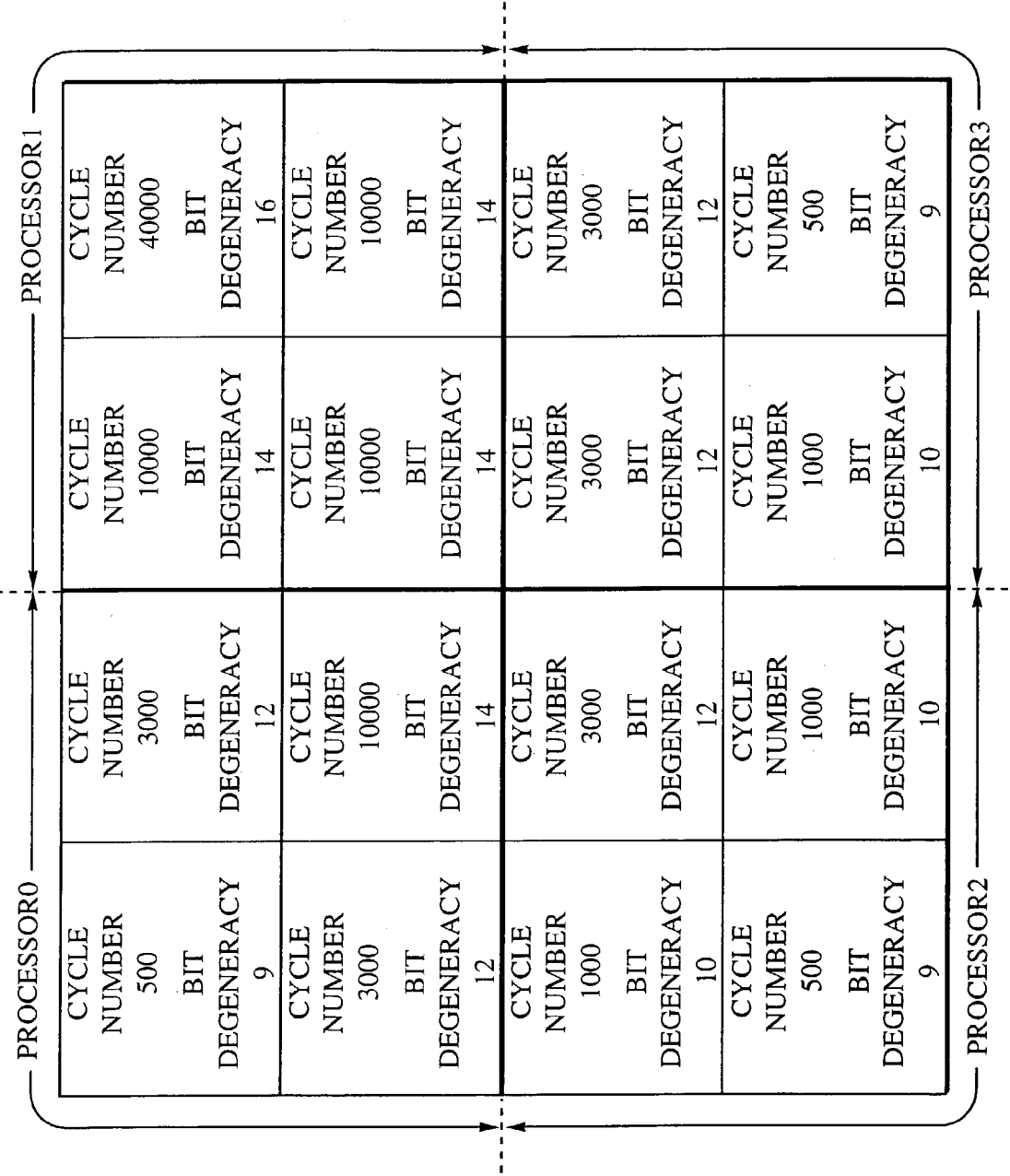
FIG. 34 is a view showing the number of execution cycle and bit-degenerated values when drawing of 16 pixel blocks is carried out by four processors (the processor 0, the processor 1, the processor 2, and the processor 3), as an example employed in explaining the sixth embodiment of the present invention.

FIG. 34 shows examples of the number of execution cycle required for the drawing of the pixels and the bit-degenerated values when the drawing of 16 pixel blocks is carried out by four processors (the processor 0, the processor 1, the processor 2, and the processor 3). In this drawing process, four pixel blocks are allocated to four processors respectively. In FIG. 34, the number of execution cycle of the processor 0 is 16500, the number of execution cycle of the processor 1 is 70000, the number of execution cycle of the processor 2 is 5500, and the number of execution cycle of the processor 3 is 7500. Based on these values, the preceding drawing information in the case shown in FIG. 34 can be given as (processor 0, processor 1, processor 2, and processor 3)=(25088, 114688, 6656, 9728)

This preceding drawing information indicates the fact that the number of execution cycle of the processor 1 is excessively large in comparison with other numbers of execution cycle. In other words, this information means that the time required for the drawing process of the processor 1 is longest one. Therefore, the number of the pixel blocks allocated to the processor 1 is reduced in the drawing process of the succeeding frame so as to reduce differences in the number of execution cycle between the processors. More particularly, the number of the pixel blocks, which is allotted to the processors in the succeeding frame respectively, can be decided based on the following equation.

$$y=(16/x)/((1/A)+(1/B)+(1/C)+(1/D))$$

where y: number of the pixel blocks allotted to respective processors in the drawing process of the succeeding frame, x: sum of values of the calculation amount information of respective processors, A: value of the calculation amount information of the processor 0, B: value of the calculation amount information of the processor 1, C: value of the calculation amount information of the processor 2, and D: value of the calculation amount information of the processor 3.

In other words, the number of the pixel blocks, which is allotted to respective processors in the succeeding frame, is decided in inverse proportion to the values of the calculation amount information of respective processors in the preceding frame. In the case shown in FIG. 34, the number of the pixel blocks allocated to respective processors in the succeeding frame can be given by (processor 0, processor 1, processor 2, and processor 3)=(2.11, 0.46, 7.97, 5.45).

Here the natural number should be used as the number of the pixel block. Therefore, following adjusting approaches may be adopted.

(1) Round one decimal.
(2) Set a numerical value less than 1 to 1.
(3) Set a total of four numerical values to 16.

Therefore, in the case shown in FIG. 34, the number of the pixel blocks allocated to respective processors in the succeeding frame can be given by (processor 0, processor 1, processor 2, and processor 3)=(2, 1, 8, 5).

For example, if the succeeding image is equal to the preceding image, the number of the pixel blocks allocated to respective processors may be adjusted based on this result, as shown in FIG. 35. In this case, the number of execution cycle of the processor 0 is 3500, the number of execution cycle of the processor 1 is 40000, the number of execution cycle of the processor 2 is 38500, and the number of execution cycle of the processor 3 is 17500. The maximum number of execution cycle in drawing the preceding frame is 70000 in the processor 1. The maximum number of execution cycle in drawing the frame at this time is 40000 in the processor 1, whereby 30000 cycles can be reduced.

According to the sixth embodiment of the present invention, the efficiency of the image processing can be improved by setting the drawing times of respective processors as equally as possible.

Seventh Embodiment

Next, a seventh embodiment of the present invention will be explained hereinbelow. The calculating times of respective processors are in proportion to the sizes of the allocated areas and the number of the objects which exit in such allocated areas. Therefore, a difference in the processing time is caused between the processor which has many objects in the charged area and the processor which has few objects in the charged area. As a result, the drawing process time of one image depends upon the processing time of the slowest processor.

In the seventh embodiment of the present invention, since the processor which has finished in advance the process in its own allocated area can further process unprocessed areas which are allocated to other processors, the efficiency of the image processing can be further improved. The seventh embodiment of the present invention will be explained with reference to FIGS. 36A to 36D and FIGS. 37A to 37C hereinafter. FIGS. 36A to 36D are views showing examples of a screen on which the image is processed by four processors 1, 2, 3, 4. FIGS. 37A to 37C are views showing examples of the processing direction of the processors.

Figure 36A:
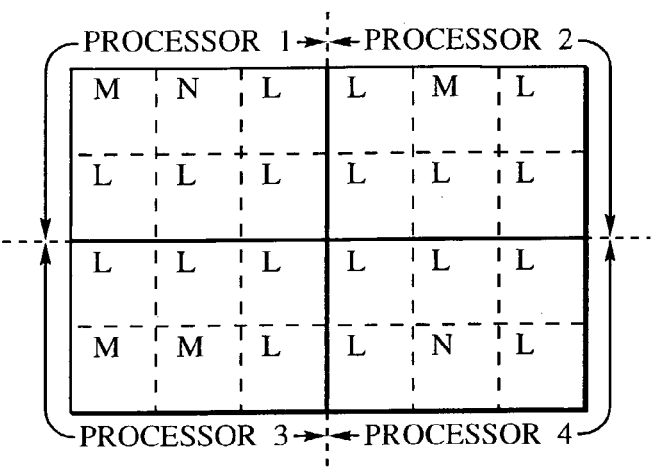
FIGS. 36A to 36D are views showing changes in processed situations of a screen which is imaged-processed by four processors 1, 2, 3, 4 relative to an elapsed time, as examples employed in explaining a seventh embodiment of the present invention.
Figure 36B:
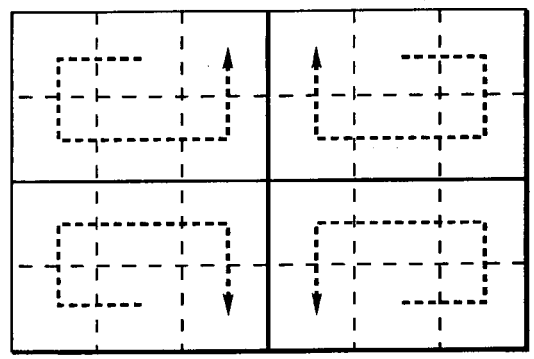
Figure 37A:
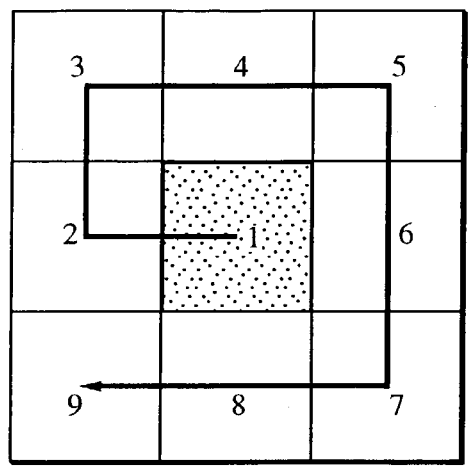
FIG. 37A is a view showing the case where the processing direction of the processors 1, 2, 3, 4 in FIGS. 36A to 36D is spiral.
Figure 37B:
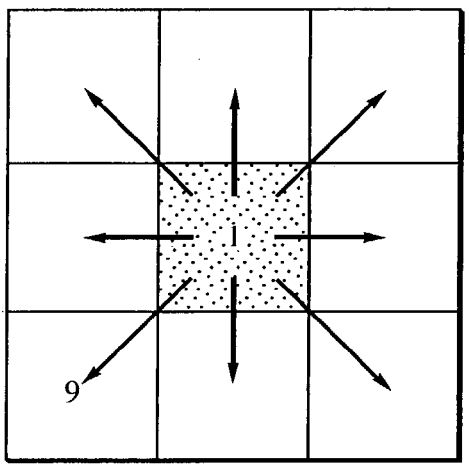
FIG. 37B is a view showing the case where the processing direction of the processors 1, 2, 3, 4 in FIGS. 36A to 36D is radial.
Figure 37C:
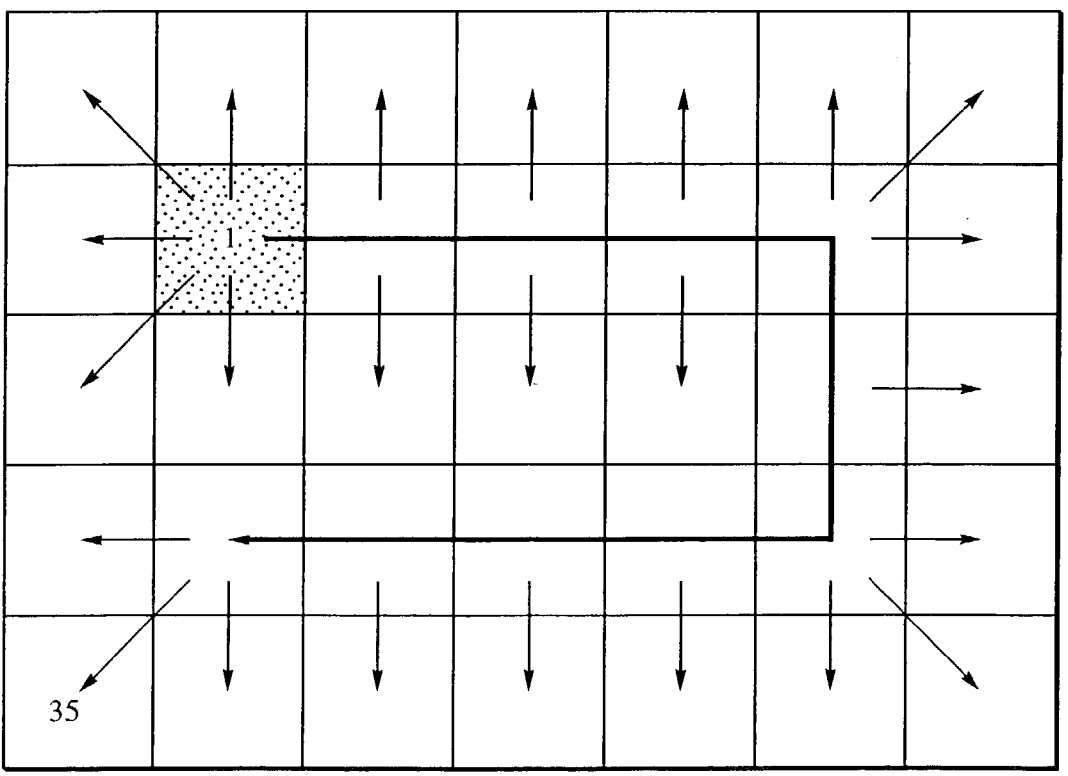
FIG. 37C is a view showing the case where the processing direction of the processors 1, 2, 3, 4 in FIGS. 36A to 36D is helical.

FIG. 36A shows a screen as the processed object. A area which is partitioned by a dotted line (called "unit area" hereinafter) is an area which can be treated at once with each processor. Suppose that a time required for the process in the unit area L is 1*t*, a time required for the process in the unit area M is 4*t*, and a time required for the process in the unit area N is 8*t*. As shown in FIG. 36A, the areas which consist of six unit areas are allocated to respective processors.

In deciding the order to process the unit areas of respective processors, two decision standards can be employed as follows:

(1) Basically the processor should execute the process toward the unit areas which do not contact ends of the allocated area. That is, the process should be advanced toward the unit areas which do not contact ends being located in the center of the screen from the inside of the allocated area.

(2) The processor should process neighboring unit areas in sequence as much as possible.

In this case, as the processing direction of the processors, for example, there are the spiral progress direction shown in FIG. 37A, the radial progress direction shown in FIG. 37B, the helical progress direction shown in FIG. 37C, or their combinational direction.

In FIG. 36A, all unit areas which are borne by respective processors come into contact with ends of respective allocated areas. Therefore, the process is executed in respective processors along the direction shown in FIG. 36B, for example.

Figure 36C:
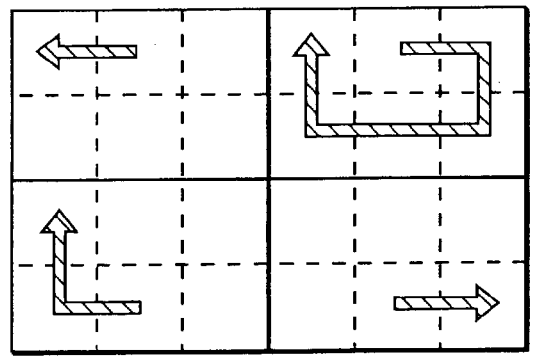

FIG. 36C is a view showing the process progress situation at a time point when a time 9*t* has lapsed from a start of the process. At this point of time, the processor 2 has finished the process in the allocated area. Then, the processor 2 begins the process in the allocated area of another processor, which is located adjacently to the lastly processed unit area. Here the area which is located adjacently to the unit area being lastly processed by the processor 2 is the area which is allocated to the processor 1. This area has not been processed at this point of time. As a result, the processor 2 proceeds the process in the unprocessed area which is allocated to the processor 1.

Figure 36D:
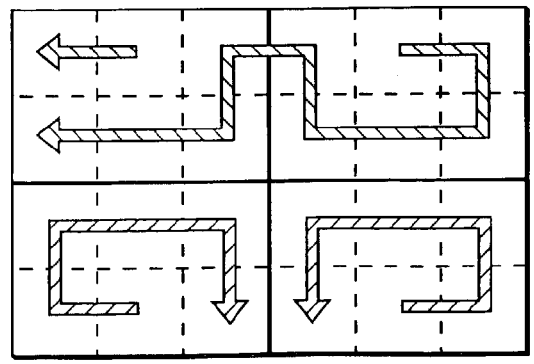

FIG. 36D is a view showing the process situation at time point when a time 9*t* has lapsed from a start of the process. All processors have been completed their processes at this point of time, so that the drawing process of the overall screen has been finished. If each processor executes the process only in the allocated area, the drawing process of the overall screen is restricted by the processor which needs the longest process time. The processor which needs the longest process time is the processor 1 and the process time is 16*t*. That is, it can be seen that, in the case of this example, the process time can be shortened by the time 3*t*.

According to the seventh embodiment of the present invention, since the processor which has the light load can assist the process of the processor which has the heavy load, the process times of respective processors can be uniformized. As a result, the higher speed of the image processing can be achieved.

Various modifications will become possible for those skilled in the art after receiving the teachings of the present disclosure without departing from the scope thereof.

What is claimed is:

1. An image processing method of executing intersection decision between a half-line passing from a viewpoint to one pixel on a screen and a three-dimensional object and executing an image process of the pixel based on a result of the intersection decision, comprising:

dividing a three-dimensional space into a plurality of small spaces;

distributing image processes of the small spaces to a plurality of processor cores, respectively;

selecting one of a plurality of three-dimensional objects in each of the small spaces and loading information of a selected three-dimensional object from a main memory to a local memory by each of the processor cores;

selecting the one pixel from a plurality of pixels and executing the intersection decision between a ray which passes the selected pixel on the screen and the selected three-dimensional object based on the loaded information by each of the processor cores; and applying the first step and the second step to all pixels and all three-dimensional objects in the three-dimensional space.

2. An image processing method of executing intersection decision between a half-line passing from a viewpoint to one pixel on a screen and a three-dimensional object and executing an image process of the pixel based on a result of the intersection decision, comprising:

dividing a three-dimensional space into a plurality of small spaces;

distributing image processes of the small spaces to a plurality of processor cores, respectively;

selecting one of a plurality of three-dimensional objects in each of the small spaces and loading information of a selected three-dimensional object from a main memory to a local memory by each of the processor cores;

transforming perspectively the selected three-dimensional object onto the screen and calculating a set of pixels onto which the selected three-dimensional object is projected by each of the processor cores;

executing the intersection decision of all pixels contained in a calculated set based on the loaded information by each of the processor cores; and applying the first step, the second step, and the third step to all three-dimensional objects in the three-dimensional space.

3. The image processing method according to claim 1, wherein the three-dimensional space is stored in a main storing portion in a situation that the three-dimensional space is divided into the plurality of small spaces which are composed of a plurality of hierarchies.

4. The image processing method according to claim 1, wherein the image process of the pixel is such a process for deciding a color and a luminous intensity which are displayed on the pixel, based on a result of the intersection decision.

5. The image processing method according to claim 1, wherein the image process of the pixel is executed based on a result of the intersection decision of the three-dimensional object which has a shortest distance between the three-dimensional object with which a half-line intersects and a viewpoint.

6. An image processing method of executing intersection decision between a half-line passing from a viewpoint to one pixel on a screen and a three-dimensional object and executing an image process of the pixel based on a result of the intersection decision, comprising:
   (a) a first step of selecting one of a plurality of three dimensional objects in a three-dimensional space and acquiring information of a selected three-dimensional object;
   (b) a second step of executing the intersection decision of all pixels on the screen based on acquired information; and
   (c) a third step of applying the first step and the second step to all three-dimensional objects in the three dimensional space,
   wherein the intersection decision includes:
   (d) a step of preparing a table in which a first field for specifying the intersected three-dimensional object, a second field for storing intersection-point coordinates to the three-dimensional object specified by the first field, and a third field for storing a distance between the three-dimensional object specified by the first field and the viewpoint are provided every pixel on the screen,
   (e) a step of executing the intersection decision of the selected three-dimensional object for the selected pixel, and
   (f) a step of updating the first field, the second field, and the third field, which correspond to the selected pixel, if the distance between the intersected three-dimensional object and the view point is smaller than the distance stored in the third field which corresponds to the selected pixel.

7. An image processing method of executing intersection decision between a half-line passing from a viewpoint to one pixel on a screen and a three-dimensional object and executing an image process of the pixel based on a result of the intersection decision, comprising:
   (a) a first step of selecting one of a plurality of three dimensional objects in a three-dimensional space and acquiring information of a selected three-dimensional object;
   (b) a second step of executing the intersection decision of all pixels on the screen based on acquired information; and
   (c) a third step of applying the first step and the second step to all three-dimensional objects in the three dimensional space,
   wherein the three-dimensional space is stored in a main storing portion in a situation that the three-dimensional space is divided into a plurality of small spaces which are composed of a plurality of hierarchies, and
   the intersection decision includes:
   (d) a step of preparing a table in which a first field for specifying the intersected three-dimensional object, a second field for storing intersection-point coordinates to the three-dimensional object specified by the first field, a third field for storing a distance between the three-dimensional object specified by the first field and the viewpoint, a fourth field for indicating whether or not the intersection decision is finished, and a fifth field for specifying a small space to be processed succeedingly are provided every pixel on the screen,
   (e) a step of executing the intersection decision of the three-dimensional object in the small spaces for all pixels which have same small spaces specified by the fifth field of the table,
   (f) a step of updating the first field, the second field, and the third field for respective pixels if the distance between the intersected three-dimensional object and the viewpoint is smaller than the distance stored in the corresponding third field, and
   (g) after the intersection decision of all three-dimensional objects in the small spaces, loading information of an end of decision onto the corresponding fourth field for the pixels in which corresponding first, second, and third fields are updated, and loading the succeedingly processed small space onto the corresponding fifth field for the pixels in which corresponding first, second, and third fields are not updated.

8. The image processing method according to claim 2, wherein the three-dimensional space is stored in a main storing portion in a situation that the three-dimensional space is divided into the plurality of small spaces which are composed of a plurality of hierarchies.

9. The image processing method according to claim 2, wherein the image process of the pixel is such a process for deciding a color and a luminous intensity which are displayed on the pixel, based on a result of the intersection decision.

10. The image processing method according to claim 2, wherein the image process of the pixel is executed based on a result of the intersection decision of the three-dimensional object which has a shortest distance between the three-dimensional object with which a half-line intersects and a viewpoint.

11. An image processing method of executing intersection decision between a half-line passing from a viewpoint to one pixel on a screen and a three-dimensional object and executing an image process of the pixel based on a result of the intersection decision, comprising:
   (a) a first step of selecting one of a plurality of three dimensional objects in a three-dimensional space and acquiring information of a selected three-dimensional object;
   (b) a second step of transforming prospectively the selected three-dimensional object onto the screen and calculating a set of pixels onto which the selected three-dimensional object is projected;
   (c) a third step of executing the intersection decision of all pixels contained in a calculated set based on acquired information; and
   (d) a fourth step of a in the first step, the second step, and the third step to all three-dimensional objects in the three-dimensional space,
   wherein the intersection decision includes:
   (e) a step of preparing a table in which a first field for specifying the intersected three-dimensional object, a second field for storing intersection-point coordinates to the three-dimensional object specified by the first field, and a third field for storing a distance between the three-dimensional object specified by the first field and the viewpoint are provided every pixel on the screen,
   (f) a step of executing the intersection decision of the selected three-dimensional object for the selected pixel, and
   (g) a step of updating the first field, the second field, and the third field, which correspond to the selected pixel, if the distance between the intersected three-dimensional object and the view point is smaller than the distance stored in the third field which corresponds to the selected pixel.

12. An image processing method of executing intersection decision between a half-line passing from a viewpoint to one pixel on a screen and a three-dimensional object and executing an image process of the pixel based on a result of the intersection decision, comprising:

(a) a first step of selecting one of a plurality of three dimensional objects in a three-dimensional space and acquiring information of a selected three-dimensional object;

(b) a second step of transforming prospectively the selected three-dimensional object onto the screen and calculating a set of pixels onto which the selected three-dimensional object is projected;

(c) a third step of executing the intersection decision of all pixels contained in a calculated set based on acquired information; and (d) a fourth step of applying the first step, the second step, and the third step to all three-dimensional objects in the three-dimensional space, wherein the three-dimensional space is stored in a main storing portion in a situation that the three-dimensional space is divided into a plurality of small spaces which are composed of a plurality of hierarchies, and the intersection decision includes:

(e) a step of preparing a table in which a first field for specifying the intersected three-dimensional object, a second field for storing intersection-point coordinates to the three-dimensional object specified by the first field, a third field for storing a distance between the three-dimensional object specified by the first field and the viewpoint, a fourth field for indicating whether or not the intersection decision is finished, and a fifth field for specifying a small space to be processed succeedingly are provided every pixel on the screen, (f) a step of executing the intersection decision of the three-dimensional object in the small spaces for all pixels which have same small spaces specified by the fifth field of the table, (g) a step of updating the first field, the second field, and the third field for respective pixels if the distance between the intersected three-dimensional object and the viewpoint is smaller than the distance stored in the corresponding third field, and (h) after the intersection decision of all three-dimensional objects in the small spaces, loading information of an end of decision onto the corresponding fourth field for the pixels in which corresponding first, second, and third fields are updated, and loading the succeedingly processed small space onto the corresponding fifth field for the pixels in which corresponding first, second, and third fields are not updated.

* * * * *